United States Patent [19]

Seymour

[11] Patent Number: 5,109,486
[45] Date of Patent: Apr. 28, 1992

[54] DISTRIBUTED COMPUTER SYSTEM WITH NETWORK AND RESOURCE STATUS MONITORING

[75] Inventor: Leslie G. Seymour, Barrington, Ill.

[73] Assignee: Motorola, Inc., Schaumburg, Ill.

[21] Appl. No.: 294,037

[22] Filed: Jan. 6, 1989

[51] Int. Cl.[5] .................... G06F 13/00; G06F 13/42; G06F 11/30
[52] U.S. Cl. ........................ 395/200; 364/DIG. 1; 364/284; 364/284.3; 364/240.8; 364/240.9; 364/264
[58] Field of Search ... 364/200 MS File, 900 MS File

[56] References Cited

U.S. PATENT DOCUMENTS

| | | | |
|---|---|---|---|
| 4,320,451 | 3/1982 | Bachman | 364/200 |
| 4,586,134 | 4/1986 | Norstedt | 364/200 |
| 4,635,189 | 1/1987 | Kendall | 364/200 |
| 4,644,468 | 2/1987 | Doster et al. | 364/200 |
| 4,644,470 | 2/1987 | Feigenbaum et al. | 364/200 |
| 4,694,396 | 9/1987 | Weisshaar et al. | 364/200 |
| 4,718,005 | 5/1988 | Feigenbaum et al. | 364/200 |
| 4,754,395 | 6/9188 | Weisshaar et al. | 364/200 |
| 4,965,718 | 10/1990 | George et al. | 364/200 |

OTHER PUBLICATIONS

"CX Common Interface Guide", Rev. 3.0, Oct. 24, 1986 Computer X, Inc.

Primary Examiner—Kevin A. Kriess
Attorney, Agent, or Firm—Walter W. Nielsen; Paul F. Wille; Raymond J. Warren

[57] ABSTRACT

A requesting manager sends a message to its local configuration processor requesting notice of status changes in a general or particular, resource or node. The configuration manager establishes a record in its status monitoring file containing the information from the requesting process' message. The configuration manager receives messages: from remote configuration managers or local resource managers regarding resource status changes; and from its local network interface module regarding node changes. The configuration manager then compares these status change notifications with the records in its status monitoring file. If there is a match, the configuration manager sends a message to the requesting process reporting the status change. The status changes that are reported may be limited by the requesting process by specifying a particular status change, a particular resource, or other option.

26 Claims, 10 Drawing Sheets

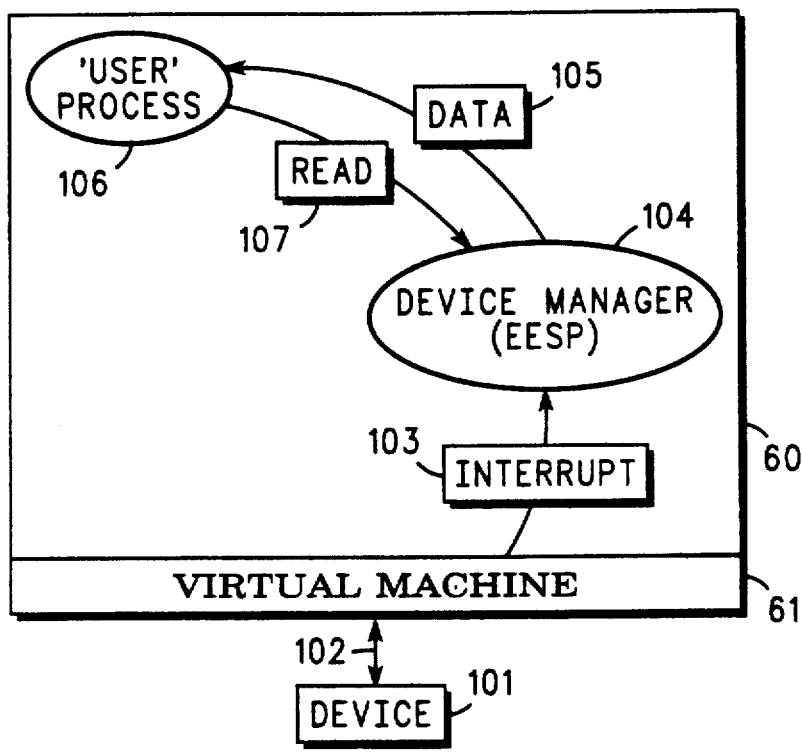
FIG. 5
FIG. 6
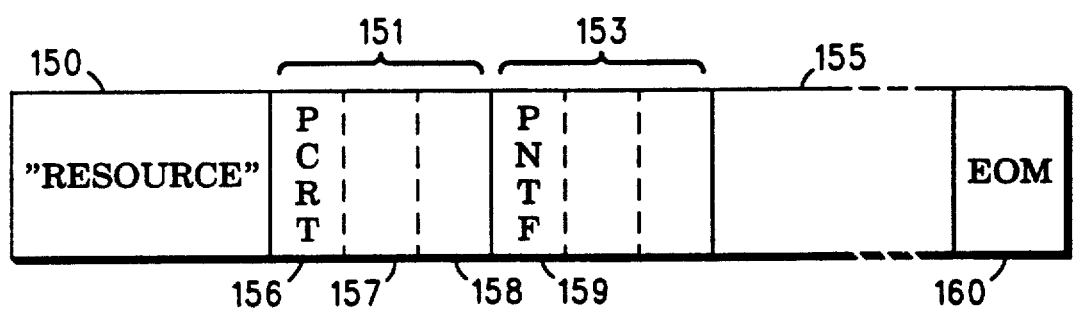

DISTRIBUTED COMPUTER SYSTEM WITH NETWORK AND RESOURCE STATUS MONITORING

RELATED INVENTIONS

The present invention is related to the following inventions, all assigned to the assignee of the present invention:

Nested Contexts in a Virtual Single Machine, invented by Andrew Kun, Frank Kolnick, and Bruce Mansfield, having U.S. Ser. No. 730,903, and filed on May 6, 1986;

Computer System with Data Residence Transparency and Data Access Transparency, invented by Andrew Kun, Frank Kolnick, and Bruce Mansfield, having U.S. Ser. No. 07/110,614, and filed on Oct. 19, 1987, this application being a continuation of U.S. Ser. No. 730,929, now abandoned;

Network Interface Module with Minimized Data Paths, invented by Bernhard Weisshaar and Michael Barnea, having U.S. Pat. No. 4,754,395, and issued on Jul. 5, 1988;

Method of Inter-Process Communication in a Distributed Data Processing System, invented by Bernhard Weisshaar, Andrew Kun, Frank Kolnick, and Bruce Mansfield, having U.S. Pat. No. 4,694,396, and issued on Sept. 15, 1987;

Logical Ring in a Virtual Single Machine invented by Andrew Kun, Frank Kolnick, and Bruce Mansfield, having U.S. Ser. No. 183,469, and filed Apr. 18, 1988, this application being a continuation of U.S. Ser. No. 730,923, now abandoned;

Virtual Single Machine with Message-Like Hardware Interrupts and Processor Exceptions, invented by Andrew Kun, Frank Kolnick, and Bruce Mansfield, having U.S. Ser. No. 730,922, and filed on May 6, 1986;

Computer Human Interface Comprising User-Adjustable Window for Displaying or Printing Information, invented by Frank Kolnick, having U.S. Ser. No. 000,625, and filed on Jan. 5, 1987;

Computer Human Interface with Multi-Application Display, invented by Frank Kolnick, having U.S. Ser. No. 000,620, and filed on Jan. 5, 1987;

Object-Oriented Software Architecture Supporting Input/Output Device Independence, invented by Frank Kolnick, having U.S. Ser. No. 000,619, and filed on Jan. 5, 1987; and Process Traps in a Distributed Message-Based Operating System, invented by Gabor Simor, having U.S. Ser. No. 000,624, and filed on Jan. 5, 1987;

Computer Human Interface with Multiple Independent Active Pictures and Windows, invented by Frank Kolnick, having U.S. Ser. No. 000,626, and filed on Jan. 5, 1987; and Self-Configuration of Nodes in a Distributed Message-Based Operating System, invented by Gabor Simor, having U.S. Ser. No. 000,621, and filed on Jan. 5, 1987.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or record, but otherwise reserves all copyright rights whatsoever.

FIELD OF THE INVENTION

The present invention relates, in general, to distributed computer systems and, more particularly, to distributed computer systems with network and resource status monitoring.

BACKGROUND OF THE INVENTION

The present invention is implemented in a distributed data processing system. A system consisting of two or more data processing systems which are capable of functioning independently but which are so coupled as to send and receive messages to and from each other.

A local area network (LAN) is an example of a distributed data processing system. A typical LAN comprises a number of autonomous data processing "nodes", each comprising at least a processor and memory. Each node is capable of conducting data processing operations independently. In addition, each node is coupled to a network of other nodes which may be, for example, a loop, star, tree, etc., depending upon the design considerations.

As mentioned above, the present invention finds utility in such a distributed data processing system, since there is a need in such a system for processes which are executing or which are to be executed in the individual nodes to share data and to communicate data among themselves.

A "process", as used herein is a self-contained package of data and executable procedures which operate on that data, comparable to a "task" in other known systems. Within the present invention a process can be thought of as comparable to a set (module) of subroutines in terms of size, complexity, and the way it is used. The difference between processes and subroutines is that processes can be created and terminated dynamically and can execute concurrently with their creator and other sets (modules) of "subroutines".

Within a process the data is private and cannot be accessed from the outside (i.e. by other processes). Processes can therefore be used to implement "objects", "modules", or other higher level data abstractions. Each process executes sequentially. Concurrent execution is achieved through multiple processes, possibly executing on multiple processors.

Every process in the distributed data processing system of the present invention has a unique identifier connector by which it can be referenced. The connector is assigned by the system when the process is created. The connector is used by the system to physically locate the process.

Every process also has a non-unique, symbolic "name", which is a variable-length string of characters. In general, the name of a process is known system-wide. To restrict the scope of names, the concept of a "context" is utilized. This concept is described in detail in copending U.S. Pat. applications having Ser. Nos. 000,621 and 000,624 cited in detail above. Basically, a context is a collection of related process whose names are not known outside of the context.

A process in one context cannot symbolically communicate with, and does not know about, processes inside other contexts. All interaction across boundaries is by means of messages and pass through a "context process".

A "message" is a buffer containing data which tells a process what to do and/or supplies it with information it needs to carry out its operation. Messages are queued from one process to another by name or connector. Queuing avoids potential synchronization problems and is used instead of semaphores, monitors, etc. The sender of the message is free to continue after the message is sent. When the receiver attempts to get the message, it will be suspended until one arrives if none are already waiting in its queue. Optionally, the sender can specify that it wants to wait for a reply and is suspended until the specific message arrives. Messages from any other source are not dequeued until after that happens.

Messages provide the mechanism by which user transparency is achieved. A process located anywhere in the system may send a message to any other process anywhere within the system if the sending process has the receiving processes name or connector. This permits process's to be dynamically distributed across the system at any time to gain optimal throughput without changing the processes which reference them. Sending messages by connector obviates the need for a name search and ignores context boundaries. This is the most efficient method of communicating.

In the present invention messages are generally composed of a message ID and one or more "triples". The message ID is a word describing the purpose of the message (e.g. status) or the request (e.g. get) encoded in it. A triple is a data portion made of three fields. The first fields generally identify the type of triple. The second field indicates how many bytes of information are contained in the third field, which may be zero (0). The third field contains the data of the message, such as a process status code.

In known data processing environments it is often necessary to add/remove resources (software or hardware types) to existing nodes. In addition, it is often necessary to add/remove nodes from the system. The connection between nodes may also become temporarily disrupted, this should not impact the correctness of the operation of the distributed service. Because of the interaction between nodes and resources of those nodes, it is essential that preexisting (remaining) nodes are notified of these additions (removals).

In the prior art, it is necessary for the system to be informed of these changes through a user interface. In addition, it is often necessary for the operation of the system to be discontinued during the reconfiguration of the system to compensate for the changes.

Presently, a local segment of a distributed resource service may lose or gain resources without the rest of the network becoming aware of the change. This change may be discovered at the next explicit access to the specific resource, but it may be too late at that time. A service could also poll all resources periodically in a logical ring. However, this polling could be too expensive in code and in performance.

In addition, presently nodes may get disconnected, restarted, and reconnected without the rest of the system becoming aware of the change. Connectors to remote resources residing on this node may become invalid with no indication to the rest of the service or to the users of the resources.

Further, some internal algorithms of the distributed services may be attempting to utilize a single "master" node in a single virtual machine in order to maintain the transparency of a single virtual machine, and thus also risk the loss or modification of the "master" node without the rest of the system being notified.

Accordingly, it is an object of the present invention to provide a distributed computer system that overcomes the above deficiencies.

A further object of the present invention is to provide a distributed computer system with network and resource status monitoring.

Another object of the present invention is to provide a distributed computer system with network and resource status monitoring which operates in a manner transparent to the users.

Still another object of the present invention is to provide a distributed computer system with network and resource status monitoring which is self-configuring.

Yet another object of the present invention is to provide a distributed computer system with network and resource status monitoring which is capable of adding and removing nodes at run-time while sustaining a nonstop mode of operation.

Another object of the present invention is to provide a distributed computer system with network and resource status monitoring in which the node and resource status monitoring are coherent with each other.

Still another object of the present invention is to provide a distributed computer system with network and resource monitoring in which the monitoring is handled in a distributed fashion.

Yet another object of the present invention is to provide a distributed computer system with network and resource monitoring which does not significantly reduce the network throughput.

Another object of the present invention is to provide a distributed computer system that provides true transparency of services running on dynamically changing configurations.

SUMMARY OF THE INVENTION

A particular embodiment of the present invention comprises a distributed computer system having a plurality of nodes with each node comprising a network interface module and a configuration manager. In operation, the configuration manager is notified by local resource managers on its node of the status situations of processes to which they desire to be kept apprised. The configuration manager of the node interacts with configuration managers of other nodes to inform the requesting processes of the statuses requested. The network interface modules also communicate with the configuration managers to inform the configuration managers when the status of any node changes. This information is used by the configuration manager to locate the remote nodes of which it was maintaining a status check. The requesting processes are then notified of the change in status.

BRIEF DESCRIPTION OF THE DRAWINGS

FIG. 5 shows the relationship between a user process and a resource process as they relate to the present invention;

FIG. 6 shows the standard format of a message in the distributed message-based data processing system of the type incorporating the present invention;

DETAILED DESCRIPTION OF THE DRAWINGS

Figure 1:
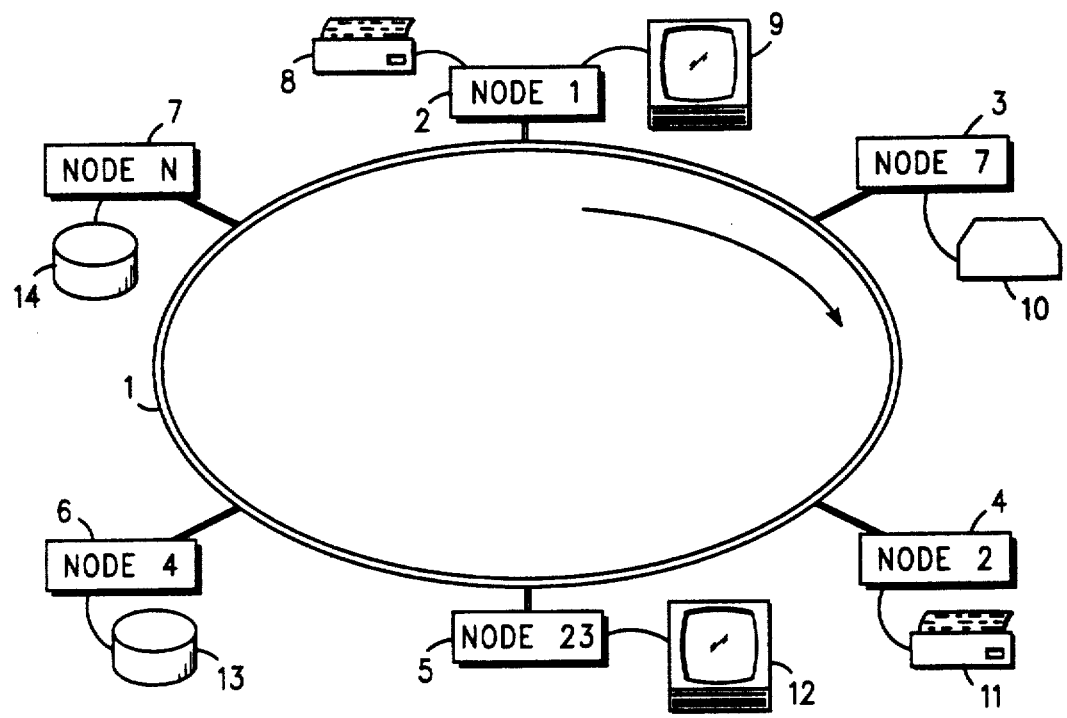
FIG. 1 shows a representational illustration of a single network, distributed message-based data processing system of the type incorporating the present invention.

Referring initially to FIG. 1, a representational illustration of a single network, distributed message-based data processing system of the type incorporating the present invention is shown. FIG. 1 comprises multiple nodes 2-7 loosely coupled by a local area network (LAN) 1. The number of nodes which may be connected to the network is arbitrary and depends upon the user application. Each node comprises at least a processor and memory, as will be discussed in greater detail with reference to FIG. 2, below. In addition, each node may also include other units, such as printers 8 and 11, operator display modules (ODM) 9 and 12, mass memory modules 13 and 14, and other I/O devices 10.

Figure 2:
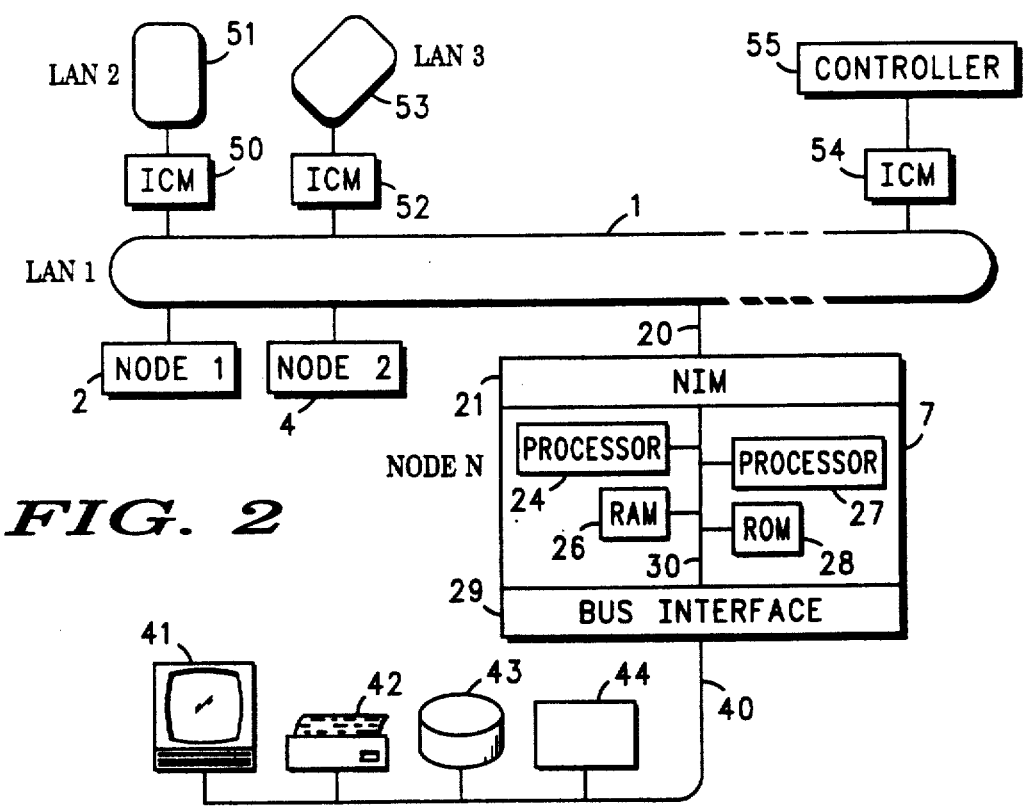
FIG. 2 shows a block diagram illustrating a multiple-network, distributed message-based data processing system of the type incorporation the present invention.

With reference now to FIG. 2, a multiple-network distributed computer configuration is shown. LAN 1 comprises several nodes 2, 4, and 7. LAN 1 is coupled to a second local area network 51 (LAN 2) by means of an Intelligent Communications Module (ICM) 50. Intelligent communications module 50 provides a link between the LAN and other networks and/or remote processors (such as programmable controllers).

LAN 2 may comprise several nodes (not shown) and may operate under the same LAN protocol as that of the present invention, or it may operate under any of several commercially available protocols, such as Ethernet; MAP (Manufacturing Automation Protocol); Systems Network Architecture (SNA); SECS-II; etc. Each ICM 50 is programmable for carrying out one of the above-mentioned specific protocols. In addition, the basic processing module of the node itself can be used as an intelligent peripheral controller (IPC) for specialized devices.

LAN 1 is additionally coupled to a third local area network 53 (LAN 3) via ICM 52. A process controller 55 is also coupled to LAN 1 via ICM 54.

A representative node N (7, FIG. 2) comprises a processor 24 which, in a preferred embodiment, is a processor from the Motorola 68000 family of processors. Each node further includes a read only memory (ROM) 28 and a random access memory (RAM) 26. In addition, each node includes a Network Interface Module (NIM) 21, which connects node 7 to LAN 1; and a Bus Interface 29, which connects node 7 to additional devices within node 7. While a minimal node is capable of supporting two peripheral devices, such as Operator Display Module (ODM) 41 and an I/O module 44, additional devices (including additional processors, such as processor 27) can be provided within a node. Other additional devices may comprise, for example, a printer 42, and a mass-storage module 43, which supports a hard disk and a back-up device (floppy disk or streaming tape drive).

Operator display module 41 provides a keyboard and screen to enable an operator to input information and receive visual information.

While a single node may comprise all of the above units, in the typical user application individual nodes will normally be dedicated to specialized functions. For example, one or more mass storage nodes may be set up to function as data base servers. There may also be several operator consoles and at least one node for generating hard-copy printed output. Either these same nodes, or separate dedicated nodes, may execute particular application programs.

The system is particularly designed to provide an integrated solution for factory automation, data acquisition, and other real-time applications. As such, it includes a full complement of services, such as a graphical output, windows, menus, icons, dynamic displays, electronic mail, event recording, and file management. Software development features include compilers, a window-oriented editor, a debugger, and a performance-monitoring tools.

The local area network discussed with reference to FIGS. 1 and 2, ties the entire system together and makes possible the distributed virtual machine model described below. The LAN provides high throughput, guaranteed response, reliability, and low entry cost. The LAN is also autonomous, in the sense that all system and applications software are unaware of its existence. For example, a network interface module could be replaced without rewriting any software other than that which directly drives the NIM.

The LAN interconnection medium may be twisted-pair or coaxial cable. Two channels (logically, two distinct networks) may be provided for reliability and for increased throughput.

The LAN architecture is logical ring type. In a logical ring, an electronic "token" is constantly passed from node to node at high speed. The current holder of the token may use it to send a "frame" of data or may pass it on to the next node in the ring. The NIM only needs to know the logical address and status of its immediately succeeding neighbor. The NIM's responsibility is limited to detecting the failure of the neighbor or the inclusion of a new neighbor. As discussed below, the adjustment to failed or newly added nodes is automatic.

The network interface maps directly into the processor's memory. Data exchange occurs through a dual-ported buffer pool which contains a linked list of pending "frames". Logical messages, which vary in length, are broken into fixed-size frames for transmission and are reassembled by the receiving NIM. Frames are sequentially numbered for this purpose. If a frame is not acknowledged within a preset period of time, it is retransmitted. The retransmission will repeat a preselected number of times before being treated as a failure.

As described above with reference to FIG. 2, the LAN may be connected to other LAN's operating under the same LAN protocol via so-called "bridgeways", or it may be connected to other types of LAN's via "gateways".

The computer operating system of the present invention operates upon processes, messages, and contexts, as such terms are defined herein. Thus, this operating system offers the programmer a hardware abstraction, rather than a data or control abstraction. Processes are referenced without regard to their physical location via a small set of message-passing primitives. As mentioned earlier, every process has both a unique system-generated identifier and a not necessarily unique name assigned by the programmer. The identifier provides quick direct access, while the name has a limited scope and provides symbolic, indirect access.

Figure 3:
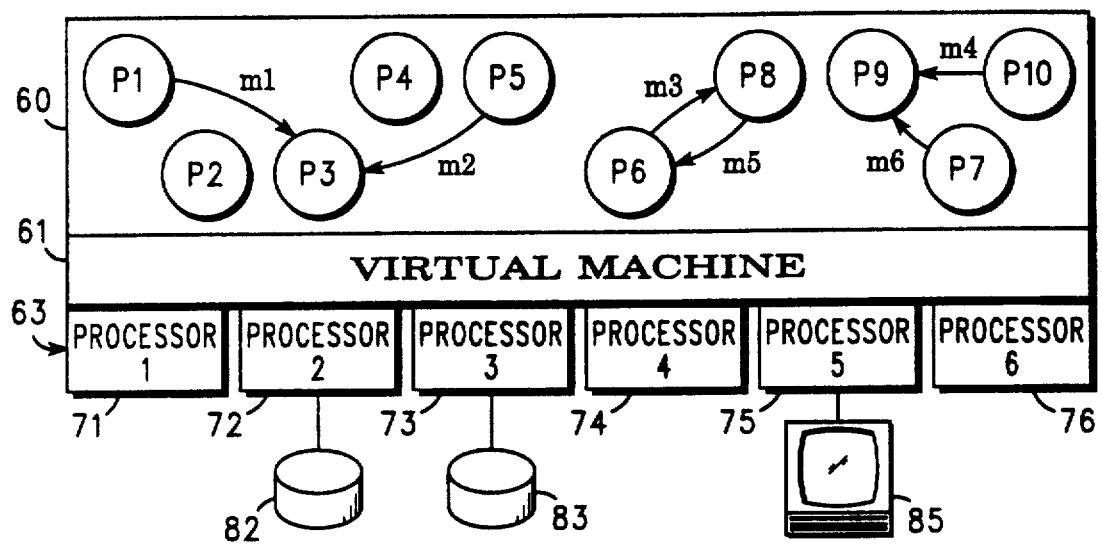
FIG. 3 shows an architectural model of a data processing system of the type incorporating the present invention.

With reference to FIG. 3, an architectural model of the present invention is shown. The bottom, or hardware, layer 63 comprises a plurality of processors 71-76. Processors 71-76 may exist physically within one or more nodes. The top, or software, layer 60 illustrates a number of processes P1-P10 which send messages m1-m6. The middle layer 61, labelled "virtual machine", isolates the hardware from the software, and it allows programs to be written as if they were going to be executed on a single processor. Conversely, programs can be distributed across multiple processors without having been explicitly designed for that purpose.

As discussed earlier, a "process" is a self-contained package of data and executable procedures which operate on that data. The data is private and cannot be accessed by other processes. There is no concept of shared memory within the present invention. Execution of a process is strictly sequential. Multiple processes execute concurrently and must be re-entrant, in which cases only one copy of the code is loaded even if multiple instances are active.

Every process has a unique "process identifier number" (PID) by which it can be referenced. The PID is assigned by the system when the process is created and remains in effect until the process terminates. The PID assignment contains a randomizing factor which guarantees that the PID will not be re-used in the near future. The contents of the PID are irrelevant to the programmer but are used by the virtual machine to physically locate the process. A PID may be thought of as a connector to a process.

Every process also has a "name" which is a variable-length string of characters assigned by the programmer. A name need not be unique, and this ambiguity may be used to add new services transparently and to aid in fault tolerance.

Figure 4:
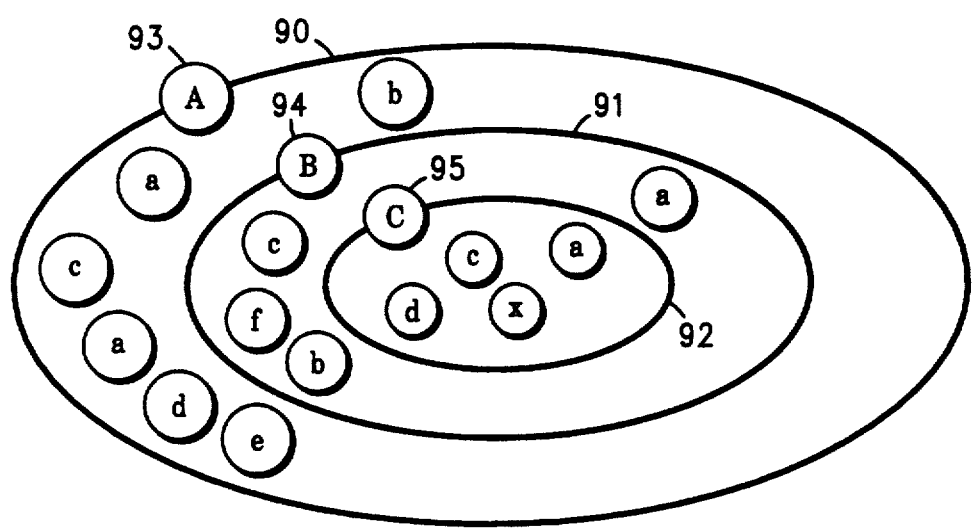
FIG. 4 shows the relationship between software contexts and processes as they relate to the present invention.

FIG. 4 illustrates that the system-wide name space is partitioned into distinct subsets by means of "contexts" identified by reference numerals 90-92. A context is simply a collection of related processes whose names are not known outside of the context. For example, context 90 contains processes A, a, a, b, c, d, and e. Context 91 contains processes B, a, b, c, and f; and context 92 contains processes C, a, c, d, and x.

One particular process in each context, called the "context process", is known both within the context and within the immediately enclosing context, called the "parent context". In the example of FIG. 4, processes A, B, and C are context processes for contexts 90, 91, and 92, respectively. The parent context of context 91 is context 90, and the parent of context 92 is context 91. Conceptually, the context process is located on the boundary of the context and acts as a gate into the context.

Processes inside context 92 can reference any processes inside contexts 90 and 91 by name. However, processes in context 91 can only access processes in context 92 by going through the context process C. Processes in context 90 can only access processes in context 92 by going through context processes B and C.

The function of the context processes is to filter incoming messages and either reject them or route them to other processes in its context. Contexts may be nested, allowing a hierarchy of abstractions to be constructed. A context must reside completely on one node. The entire system is treated as an all-encompassing context which is always present and which is the highest level in the hierarchy. In essence, contexts define localized protection domains and greatly reduce the chances of unintentional naming conflicts. If appropriate, a process inside one context can be "connected" to a process inside another context by exchanging PIDs, once contact has been established through one or the other of the context processes. Most process servers within the present invention function that way. Initial access is by name. Once the desired function (such as a window or file) is opened, the user process and the service communicate directly via their PIDs.

A "message" is a variable length buffer (limited only by the processor's physical memory size) which carries information between processes. A header, inaccessible to the programmer, contains the destination name and the sender's PID. By convention, the first field in a message is a null-terminated string which defines the type of message (e.g., read, status, etc). Messages are queued to the receiving process when they are sent. Queuing ensures serial access and is used in preference to semaphores, monitors, etc.

Messages provide the mechanism by which hardware transparency is achieved. A process located anywhere in the virtual machine can send a message to any other process if it knows its name. Transparency applies with some restrictions across bridgeways (i.e., the interfaces between LANs operating under identical network protocols); and, in general, not at all across gateways (i.e., the interfaces between LANs operating under different network protocols) due to performance degradation. However, they could so operate, depending upon the required level of performance.

With reference now to FIG. 5, the relationship of external events to processes will now be described. The virtual machine makes devices look like processes. For example, when an interrupt occurs in an external device 101, the virtual machine kernel 61 queues an interrupt message 103 to specific process 104, known as an "External Event Service Process" (EESP), functioning as the device manager. For efficiency, the message is preallocated once and circulates between the EESP and the kernel. The message contains just enough information to indicate the occurrence of the event. The EESP performs all hardware-specific functions related to the event, such as setting control registers, moving data 105 to a user process 106, transmitting read messages from the user process 106, etc., and then releasing the interrupt.

To become an EESP, a process issues a "connect" primitive specifying the appropriate device register(s). It must execute a "disconnect" before it exits. Device independence is achieved by making the message protocol between EESPs and applications processes the same wherever possible.

Referring now to FIG. 6, a block diagram representing the standard format of a message in the distributed message-based data processing system of the type incorporating the present invention is illustrated. The message format comprises a message ID portion 150; one or more "triples" 151, 153, and 155; and an end of message (EOM) portion 160. Each triple comprises a group of three fields, such as fields 156-158.

Field 156 of triple 151, designated PCRT field, specifies that the data field represents the name of the process to be created. Field 157 of triple 151 gives the size of the data field, which may be zero (0) Field 158 is the data field whose size is given in field 157. If the size of field 158 is zero, then field 158 does not exist.

A field 159 of triple 153, designated the PNTF field, specifies that the data field represents the name of the process to notify when the process specified in the PCRT field has been created.

A message can have any number of triples. There can also be multiple triples in the same message containing PCRT and PNTF fields, since several processes may have to be created for the same resource.

As presently implemented, portion 150 is 16 bytes in length, field 156 is 4 bytes, field 157 is 4 bytes, field 58 is variable in length, and EOM portion 160 is 4 bytes.

Figure 7:
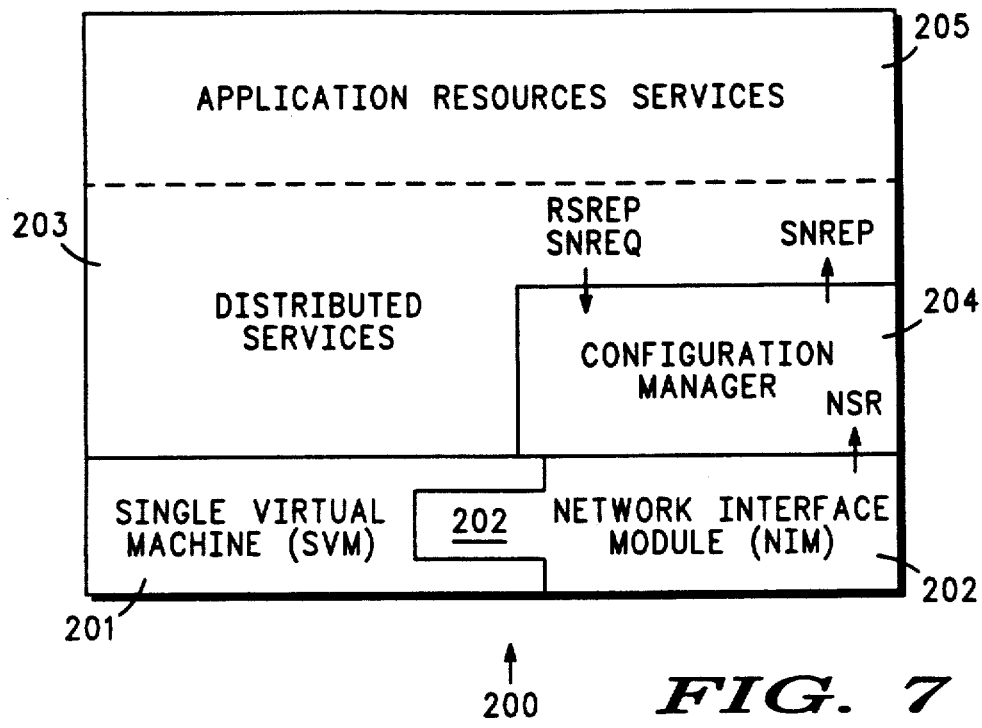
FIG. 7 shows an architectural model illustrative of the status monitoring of a data processing system embodying the present invention.

Referring to FIG. 7, an architectural model, generally designated 200, illustrating the status monitoring of a data processing system embodying the present invention is illustrated. Model 200 consists generally of a single virtual machine (SVM) kernel 201 and a network interface module (NIM) 202 at the bottom level. Above SVM 201 and NIM 202, is a layer of distributed services 203 and a configuration manager 204. Overlying and interacting with distributed services 203 is a layer of application resource services 205.

In operation, a process may be created which requires access to a particular resource. However, before accessing the resource, the process needs to know the status of the resource (i.e. is it present on the system, is it busy, is it available, etc.). Since the process can not make this determination itself, a request is sent to the local configuration manager. The configuration manager will then determine the status of the resource and report back to the requesting process. This status determination is made by contacting the remote configuration manager for the node containing the resource. User transparent distributed services are provided by the use of the configuration manager for the described network monitoring process.

Figure 8:
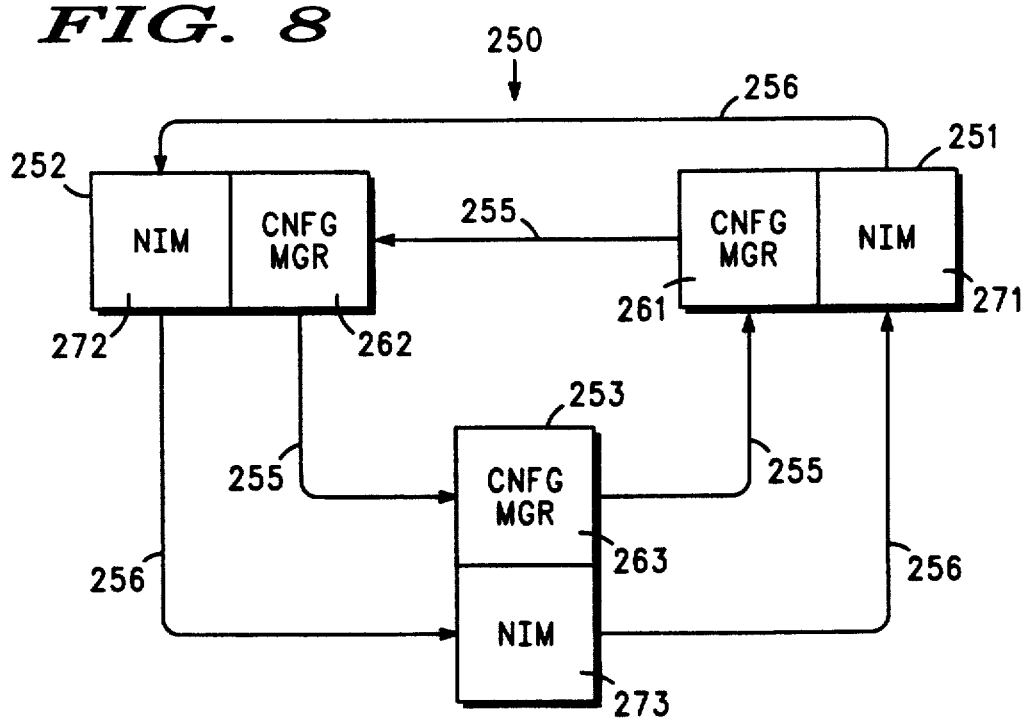
FIG. 8 shows a representational illustration of a network illustrating the communication process utilized by the present invention.

In using the configuration managers for this status type of communication, the NIMs are left for the more important network communication traffic. In FIG. 8, a representational diagram of a network, generally designated 250, illustrating the communication process utilized by the present invention is shown. In FIG. 8, network 250 is illustrated having three nodes 251-253. Each node 251-253 having a configuration manager 261-263 and a network interface manager 271-273. As shown, configuration managers 261-263 are coupled by communication lines 255 and the network interface modules 271-273 are coupled by communication lines 256.

In this configuration, NIMs 271-273 are utilized for certain status information. NIMs 271-273 are relied upon for status information on remote nodes in general. General information includes, for example, notification of when a node is added or removed from the system. Since the configuration manager of the deleted/added node cannot (or does not know to) notify other configuration managers of the change, the NIMs of the remaining network communicate with their local configuration manager to give notice of the change. As illustrated in FIG. 7, the only overlying software that is in communication contact with the NIM is the configuration manager.

In a more detailed explanation of the operation, there are four different types of messages used in the present invention. These are designated SNREQ (Status Notification REQuest), RSREP (Resource Status REPort), SNREP (Status Notification REPort), and NSR (Node Status Report). The SNREQ is sent by a process to configuration manager 204. The SNREQ message is in the form:

$$\text{"set" stat; [id \#1:ID;] [hold;] [sync; | rply;]} \quad (1)$$

where:

"set" stat is the message type, in this instance a message to set a status request of resource statuses that are reported to configuration manager 204;

[id #1:ID;] is a triple to identify the request for selection in a later "cancel" request;

[hold;] is an option that will keep the SNREQ in place until cancelled; and

[sync; | rply;] is an option which allows for only one of either a sync or reply command, the "sync" command directs the configuration manager to reply to the requesting process only when a synchronizing event occur; whereas the "rply" command directs the configuration manager to reply immediately after the recording of the request has been completed.

If message (1) is sent, as it appears above, each "status" message sent to configuration manager 204 is reported to the requesting process. There are three ways to restrict the status messages reported to the requesting process. These restrictions are implemented by adding an option to the message. One of the options is set forth below in message (2).

$$\text{[conn\#C: res\_conn;] [code\#1: code; [subs\#s; subsname;] [off;]]} \quad (2)$$

where:

[conn#C: res conn;] is a triple which explicitly specifies the resource to be monitored;

[code#1; code; . . . ] is a triple which can be used to further restrict the reply by requiring the specified resource to have a specified resource status code value;

[subs#s; subsname;] is a triple used if code#1 is subsystem specific and requires that the code come from that subsystem; and

[off;] is a triple which provides an inverse option. The "off" option is better understood by referring to the possible states. If the requesting process desires to know when a resource becomes available, it will not specify the "off" option since it is not concerned with what state the resource was in prior to becoming available. If the requesting process desires to know when a resource moves off of the available state, the "off" option is used since the requesting process is not concerned with the new state of the resource.

A second option is set forth in message (3) as:

[mtch; xxxx#. . . ;]  (3)

where [mtch; xxxx#. . . ;] is a triple which looks for a match between the "set" message and the resource definition message that is sent by the configuration manager to the resource manager reporting the status change. The third option is set forth in message (4) as:

[orig#s: procname;] [code#1: code; [subs#s: subsname;]]  (4)

where:

[orig#s: procname;] is a triple which limits the status message to those from a specified originator process;

[code#1: code; . . . ] is a triple which can be used to further restrict the reply by requiring the specified resource to have a specified resource status code value; and

[subs#s subsname;] is a triple used if code#1 is subsystem specific and requires that the code come from that subsystem.

Figure 9:
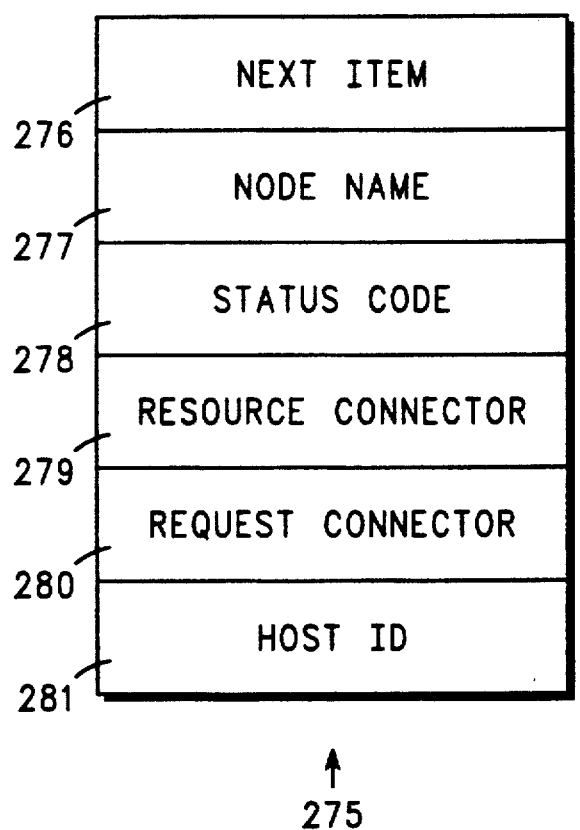
FIG. 9 shows a block diagram representing a record of a status monitoring file of a configuration manager.

Upon receipt of this message from a process, configuration manager 204 adds a record to a status monitoring file with the information provided in the SNREQ. If a status monitoring file does not exist, one is created by the configuration manager. Each record in the file consists of one or more of the following segments of data set out in FIG. 9. In FIG. 9, a record, generally designated 275, is illustrated. Record 275 consists of several segments of data. A first data segment is the NEXT ITEM segment 276. Segment 276 serves as a link to the next record in the status monitoring file in configuration manager 204.

The next segment is a NODE NAME segment 277 (used for node status changes). Segment 277 specifies a particular node by name for which the requesting process has set the status request. If no node is specified, then the request is presumed to be for the entire network. If the request is made for the entire network, or if the node name is the only item specified, the configuration manager queries the system to determine the pertinent nodes presently on the system. The configuration manager will set up a separate record for each such node on the system and link these records in record 275.

Following NODE NAME segment 277 is a STATUS CODE segment 278. Segment 278 is used if the message specified that the requestor was only interested in certain status changes of the resource. If the STATUS CODE is unspecified in the message, then all status changes are reported to the requesting process.

A RESOURCE CONNECTOR segment 279 follows STATUS CODE segment 278. Segment 279 is used if the requesting process is interested in the status change for a particular resource.

Following RESOURCE CONNECTOR segment 279 is a REQUEST CONNECTOR segment 280. Segment 280 is the identification of the requesting process. This informs the configuration manager who to contact when the monitored status change occurs. Finally, a HOST ID segment 281 is provided to identify the ID of the node; the status of which is requested to be monitored. Since the HOST ID is made up of a combination of CPU and node ID's, this number can also be used to identify the particular CPU on which the process resides.

The above operation is all conducted on the local node. The local node now awaits notification of changes in status of various resources and checks its status monitoring file to see if a report needs to be generated. This is all that is required of the system to be functional. However, this requires that a message be circulated between the configuration managers every time a resource status changes. In order to reduce the number of messages, the remote node configuration managers may be only notified of resources on the local node which are being monitored remotely. It is not important that the remote node be aware of which nodes are monitoring its resource. When a status of the monitored resource changes, the node recognizes that the status is being monitored by other nodes and sends out a message of the status change. If the resource is not being monitored, then no message is sent.

An example of how a remote node may be notified that one of its resources is no longer being monitored by a specific requesting process is by the use of termination traps as described in the copending patent application "Process Traps in a Distributed Message-Based Operating System" identified above.

Once a status request has been established, it may be cancelled by using command (5) below:

"cancel" stat; [who #C: setproc;] [id #1: ID;]
[hold;][next;] [sync; | rply;]  (5)

where:

[who #C: setproc] is a triple used by someone other than the original requestor to identify who the requestor was;

[id #1: id;] is a triple which identifies the original request to be cancelled;

[hold;] is a triple which indicates that the request was to be held until it is cancelled;

[next;] is a triple which directs that only the next matching request be canceled; and

[sync; | rply;] is a triple that directs a response be made either at a synchronized time or immediately.

The "cancel" command may also have options set out in statements (2)-(4) above which would be used to match the requests before cancelling a particular request.

The second type of message is transmitted from a resource manager to the configuration manager and is labeled RSREP (Resource Status REPort). This message is sent to the local configuration manager whenever the status of a resource on that manager's node changes. The local configuration manager then may transmit this status change to the remote configuration managers. The configuration managers check their lists of status requests for matches to the RSREP. If the report matches a request, the requesting process is notified of the status change by a SNREP (Status Notification REPort) message.

The above procedure permits the configuration managers to monitor resource status without the intervention of the network interface module. However, if the node containing the monitored resource is removed from the system, the configuration manager of the removed node will be unable to report this to the system. In a like manner, a new node may be added but the new configuration manager may not know when to transmit a message of this change to the system. In these instances, it is the responsibility of the network interface module to notify its configuration manager of these node changes.

In standard operation, the network interface modules communicate in a logical ring fashion. In this type of communication, messages are passed around the ring from node to node. Therefor, the receiving node is only aware of its immediately preceding node. In FIG. 8, the communication between NIMs 271-273 occurs along communication lines 256. Messages are passed from NIM 271 to NIM 272; from NIM 272 to NIM 273; and from NIM 273 to NIM 271. It should be understood that messages may commence from any of the nodes.

When messages are passed, a portion of the message contains the identification of the node forwarding the message. If NIM 273 receives a message directly from NIM 271, then NIM 273 knows that node 252 is no longer active in the network. NIM 273 will pass this information on to node 251. In addition, NIM 273 will generate an NSR (Node Status Report) message and transmit it to its local configuration manager, FIG. 7. The NSR message will function to provide five different status reports (codes): local node added to ring; local node off; local node rebooted; local node master; and one or more predecessor nodes off in range.

The message format of the NSR from the NIM to the configuration manager for the first four status codes is set forth in message numbered (6) below.

```
"status" code#1: [cX_AVAILABLE |
    cX_UNAVAILABLE —cX_MASTER |
    cX_RESTARTED]; orig#s: "$&@*#nimtm";
    self;                                          (6)
``` where
code#1: [cX . . . ] is a triple representing the code of one of the statuses listed (e.g. the status code for $cX_{13}$ AVAILABLE is 3001).

orig#s: "$&@*#nimtm" is a triple representing the originating process name; and self is a triple indicating that this is reporting the status of the local node.

If the status represents an intersection of several states with separate "code" values, a separate status message is sent with each applicable "code" value. For example, when a rebooted node gets in the ring with the highest node ID value, three status messages are sent with respective "code" values of cX_AVAILABLE, cX_MASTER, and cX_RESTARTED.

The message format of the NSR from the NIM to the configuration manager for the fifth status code, one or more predecessor nodes off in range, is set forth in message numbered (7) below.

```
"status" code#1: cX_UNAVAILABLE; orig#s:
    "$&@*#nimtm"; frst#1: 1st_ndid; last#1:
    last_ndid;                                     (7)
``` where:
code#1: cX_UNAVAILABLE; is the status code triple;

orig#s: "$&@*#nimtm" is the originating process name triple;

frst#1: 1st_ndid is the first node ID triple; and last#1 last_ndid is the last node ID triple, the first and last node IDs defining the range of unavailable node IDs.

Another type of SNREQ is used for monitoring events when an existing node is disconnected and reconnected or a new node is added. The message is used to set status requests in the local configuration managers and has the format set forth below in message numbered (8).

```
"set" node; [name#s: nodename | host#1:
    OxYYYY]; [code#1: nim_status[: off]]; [id];
    [hold]; [sync | rply]                          (8)
``` where:
"set" node indicates that node status change notifications are requested;

[name#s: nodename | host#1: OxYYYY] is a triple of either the name of the node or the ID number of the node to be monitored;

[code#1: nim_status . . . ] is a triple indicating the status of the NIM of the node to be monitored, by including the [off]option, the status is reported if the node moves away from the code status rather than into the code status indicated;

[id] is an identification triple of the request;

[hold] is a triple indicating that the request is to be maintained (e.g. not canceled after one status change is reported); and

[sync | rply] is the triple indicating that any status change is to be reported at a synchronized time or immediately.

The notification message takes the form set forth in message numbered (9).

```
"status" node; name#s: nodename; conn#C:
    nodedesc; code#1: nim_status                   (9)
``` where:
"status" node is a message ID and a triple indicating the message type;

name#s: nodename is the nodename triple;

to the node conn#C: nodedesc is a connector triple description message; and code#1: nim_status is the code number of the NIM status being reported.

These types of requests can be cancelled by sending out a matching cancel. The format of this message is set forth below in message numbered (10).

```
                                                  (10)
"cancel" node; [name#s: nodename | host#1: OxYYYY];
    [code#1: nim_status[: off]]; [who#C]; [next]; [ id]; [tag];
    [sync | rply]
``` where:
"cancel" node is the message type triple;

[name#s . . . | host#1 . . . ] is the name or ID number triple of the node;

[code#1: . . . ] is the code of the NIM status which was requested;

[who#C] is the triple of the connector of the requestor, required if someone other than the requestor is sending the cancel message;

[next] is a triple that directs the cancellation of the next matching request only;

[id] is the triple of the selecting requestor;

[tag] is a triple that may be used instead of the [id]triple to identify the selected requestor; and

[sync | rply] is a triple indicating either to hold the reply until a synchronizing event occurs or to reply immediately.

If no "next", "tag", or "id" triples are present, all matching requests are cancelled.

When the configuration manager receives, information regarding the status of a node, it checks its status monitoring file to determine if any status reports need to be generated. If the configuration manager receives a message that a node has been removed from the system, it checks its file and notifies any processes of a status change for any resources being monitored that were on the disconnected node or of the status change of the node itself.

Likewise, if the configuration manager receives a message that a new node has been connected, the configuration manager checks its status monitoring file to identify any requests dealing with the new node or with the system in general. In the prior instance, the configuration manager will inform the requesting process of the status change. In the later case, the configuration manager will automatically establish new status request records in the file for resources on the new node and may inform the requesting processes.

Figure 10:
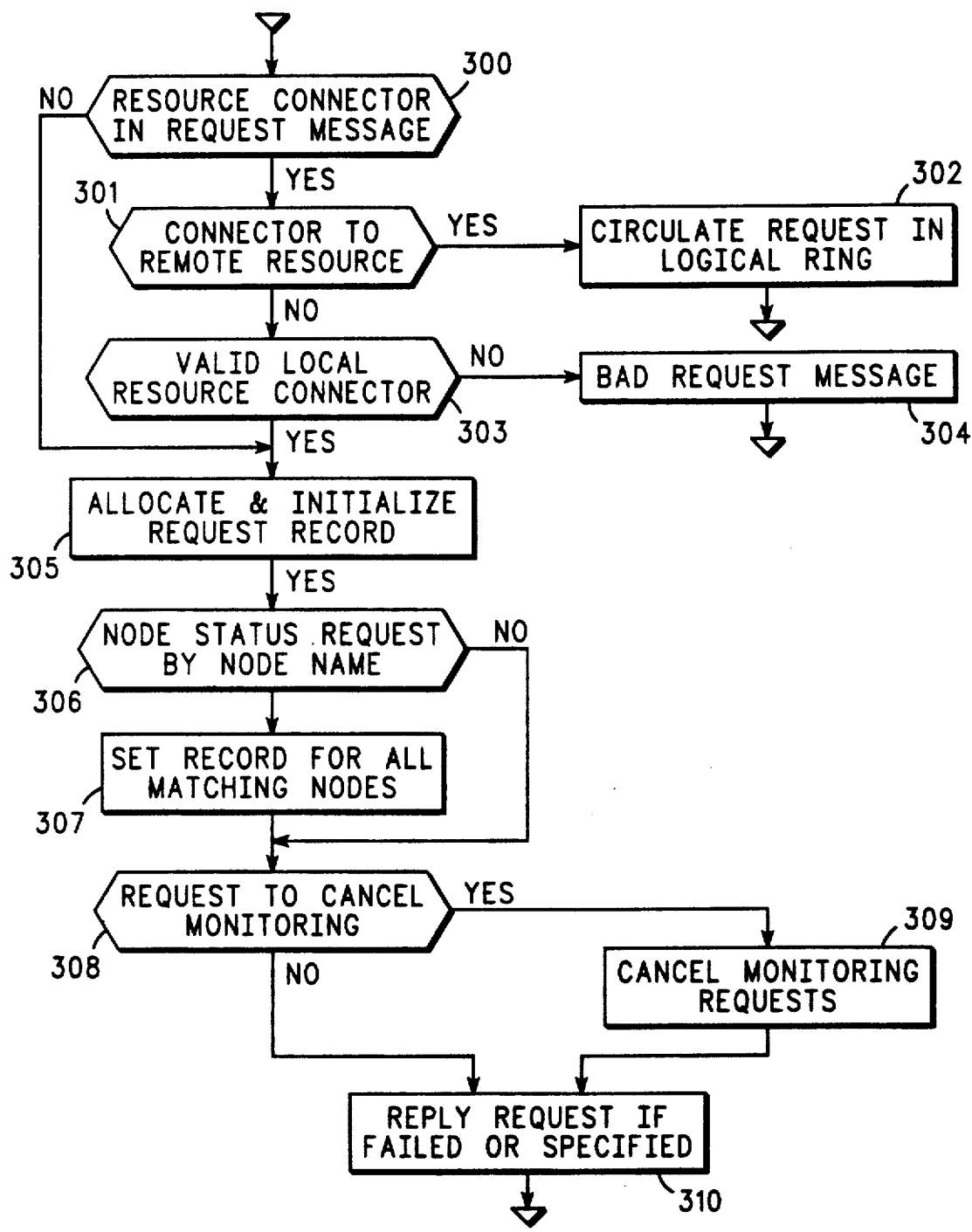
FIG. 10 shows a flow chart embodying the present invention for setting and canceling status notification requests.

Referring now to the flow charts of FIGS. 10–14, a process embodying the present invention is illustrated. Flow charts 10–14 relate to various portions of the code listing contain in Appendix A. In FIG. 10, a process of setting and canceling status notification requests is illustrated. The routine commences at decision block 300 where the process checks to see if there is a resource connector in a request message received by the configuration manager, line 64 of Appendix A. If there is a resource connector in the request message, the routine moves to decision block 301 where the process determines if the connector is to a remote resource, line 67 of Appendix A. If the connector is to a remote resource, the process moves to block 302 where the request message is circulated in the logical ring, line 68 of Appendix A.

If the connector is not to a remote resource, the process moves from decision block 301 to decision block 303. In decision block 303, the process determines if the connector is a valid logical resource connector, lines 71 and 266–281 of Appendix A. If the connector is not a valid local connector, the process moves to block 304 where a bad request message is reported, line 73 of Appendix A.

If there was no resource connector in the request message, decision block 300, or if the connector is a valid local connector, decision block 303, then the process moves to block 305 where a request record is allocated and initialized, line 76–178 of Appendix A. The process then continues on to decision block 306 where the process determines if a node status request is being made by nodename, lines 166–171 of Appendix A. If a node status request by nodename is made, the process moves to block 307 where a record is set for all matching nodes, lines 180 and 292–378 of Appendix A.

If a node status request by nodename, decision block 306, is not made or following block 307, the process moves to decision block 308 where the process determines if there was a request to cancel monitoring, line 196 of Appendix A. If there was a request to cancel monitoring, the process moves to block 309 where the monitoring request is canceled, lines 197 and 406–467 of Appendix A. Following block 309 or if there was no request to cancel a record, decision block 308, the process moves to block 310 where a reply is generated if the request failed or if a reply is specified, lines 203–215 of Appendix A. The process then exits this routine.

Figure 11:
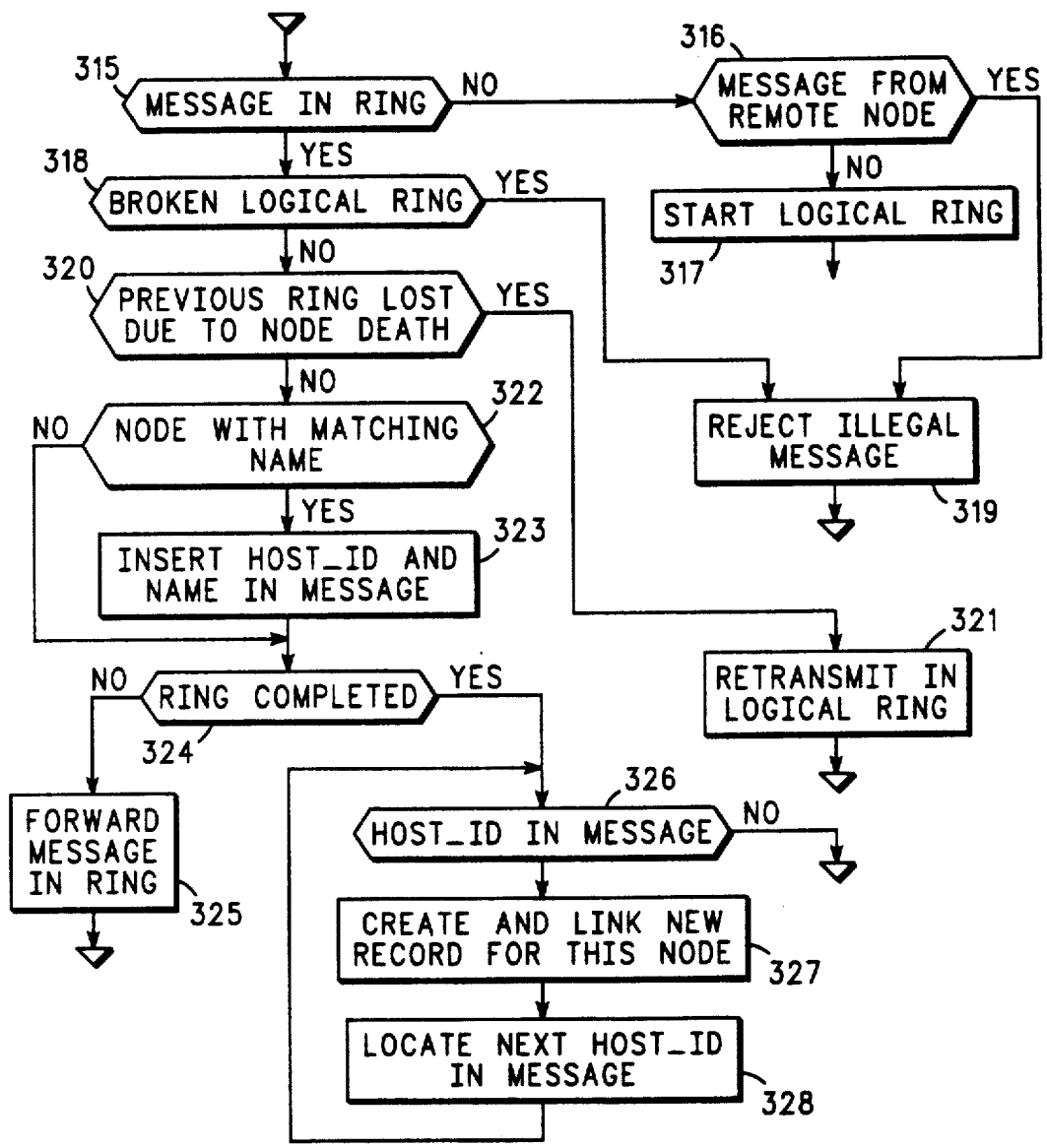
FIG. 11 shows a flow chart embodying the present invention for the flow chart step of FIG. 10 of setting a record for all matching nodes step.

Referring now to FIG. 11, a flow chart for the setting of the record for all matching nodes, block 307 of FIG. 10, is illustrated. This routine commences with decision block 315 where the process determines if the received message is in the logical ring, line 305 of Appendix A. If the message is not in the logical ring, the process moves to decision block 316 where the determination is made as to whether the message is from a remote node, line 326 of Appendix A. If the message is not from a remote node, the system moves to block 317 where the message is passed to the logical ring, line 329 of Appendix A.

If the message was in the logical ring, decision block 315, the process moves to decision block 318 where a determination is made as to whether the logical ring is broken, line 307 of Appendix A. If the logical ring is broken, block 318, or if the message is from a remote node, block 316, the routine moves to block 319 where the message is rejected as an illegal message, lines 308 or 327 of Appendix A.

If the logical ring is not broken, the process moves to decision block 320 where a determination is made as to whether the previous ring was lost due to node death, line 320 of Appendix A. If the ring was lost to node death, the process moves to block 321 where the message is retransmitted in the logical ring, lines 310–311 of Appendix A.

If the previous ring was not lost due to node death, decision block 320, then the process moves to decision block 322 to determine whether there is a node with a name matching that of the node name in the message, line 314 of Appendix A.

If there is a node with a matching name, then the process moves to block 323 where the host ID and name are inserted into the message, line 315–316 of Appendix A. Following block 323 or if there was no node with a matching name, decision block 322, the process moves to decision block 324 where a determination is made as to whether the logical ring is completed, lines 319–320 of Appendix A. If the logical ring has not been completed, the process moves to block 325 where the message is forwarded in the ring, line 321 of Appendix A.

If the ring was completed, block 324, the process moves to decision block 326 where the process looks to see if there is a host ID contained within the message, line 359 of Appendix A. If there is no host ID within the message, this routine ends. If there is a host ID within the message, the routine moves to block 327 where a new record for this node is created and linked to the previous records, lines 360–373 of Appendix A. Following block 327, the next host ID within the message is located in block 328, line 359 of Appendix A. The routine then loops back to block 326 to see if there is a host ID in the message.

In the routine shown in FIG. 11, a status request message has been passed around the logical ring to each of the nodes. If the node contained the resource for which status was requested, that node inserted its host ID number. When the message is received back by the originating configuration manager, the host IDs which were inserted in the message are retrieved and a status request record is established for each node which contained that particular resource.

Figure 12:
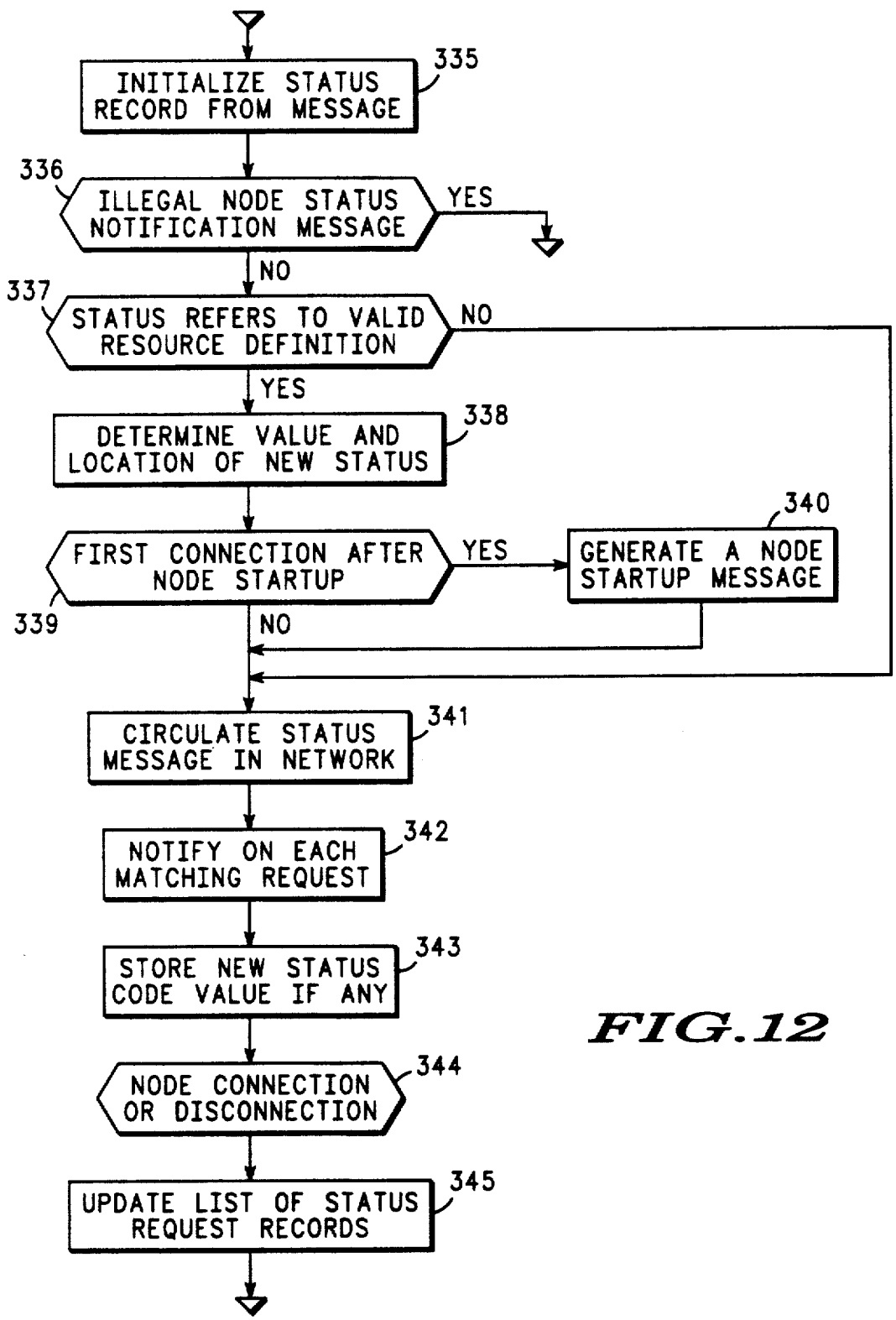
FIG. 12 shows a flow chart embodying the present invention for the steps taken in response to a status notification message.

Referring now to the flow chart of FIG. 12, a process of how the present invention acts on status notification messages is illustrated. This routine commences at block 335 where a status record is initialized from the message, lines 545–527 of Appendix A. Following block 335, the routine enters decision block 336 where a determination is made as to whether the status notification message is an illegal node status notification message, lines 574 and 679-719 of Appendix A. If the message is an illegal node status notification message the routine ends. If the message is not an illegal node status notification message, the process moves to decision block 337 where a determination is made as to whether the status refers to a valid resource definition, lines 584-588 of Appendix A. If the status is for a valid resource definition, the process moves to block 338 where the value and location of the new status is determined, lines 590-606 of Appendix A.

Following block 338, the process moves to decision block 339 where a determination is made as to whether this status notification message is from a first connection after a node start up, line 608 of Appendix A. If this does represent a node startup, the process moves to block 340 where a node startup message is generated, lines 610 and 635-658 of Appendix A. Following block 340; or if the message was not a first connection message after a node start up, block 339; or if the status did not refer to a valid resource definition, block 337, the process moves to block 341 where a status message is circulated in the network, lines 614 and 775-858 of Appendix A. Following block 41 is block 342 where a notification is transmitted for each matching request, line 619 and 725-767 of Appendix A. Following block 342 is block 343 which stores the new status code value, if one exists, lines 624-625 of Appendix A.

Following block 343, the process passes to decision block 344 where the system determines if there was a node connection or disconnection, lines 627-628 of Appendix A. Following block 344 is block 345 is where the list of status request records is updated, lines 329 and 1196-1250 of Appendix A. This routine then ends.

Figure 13:
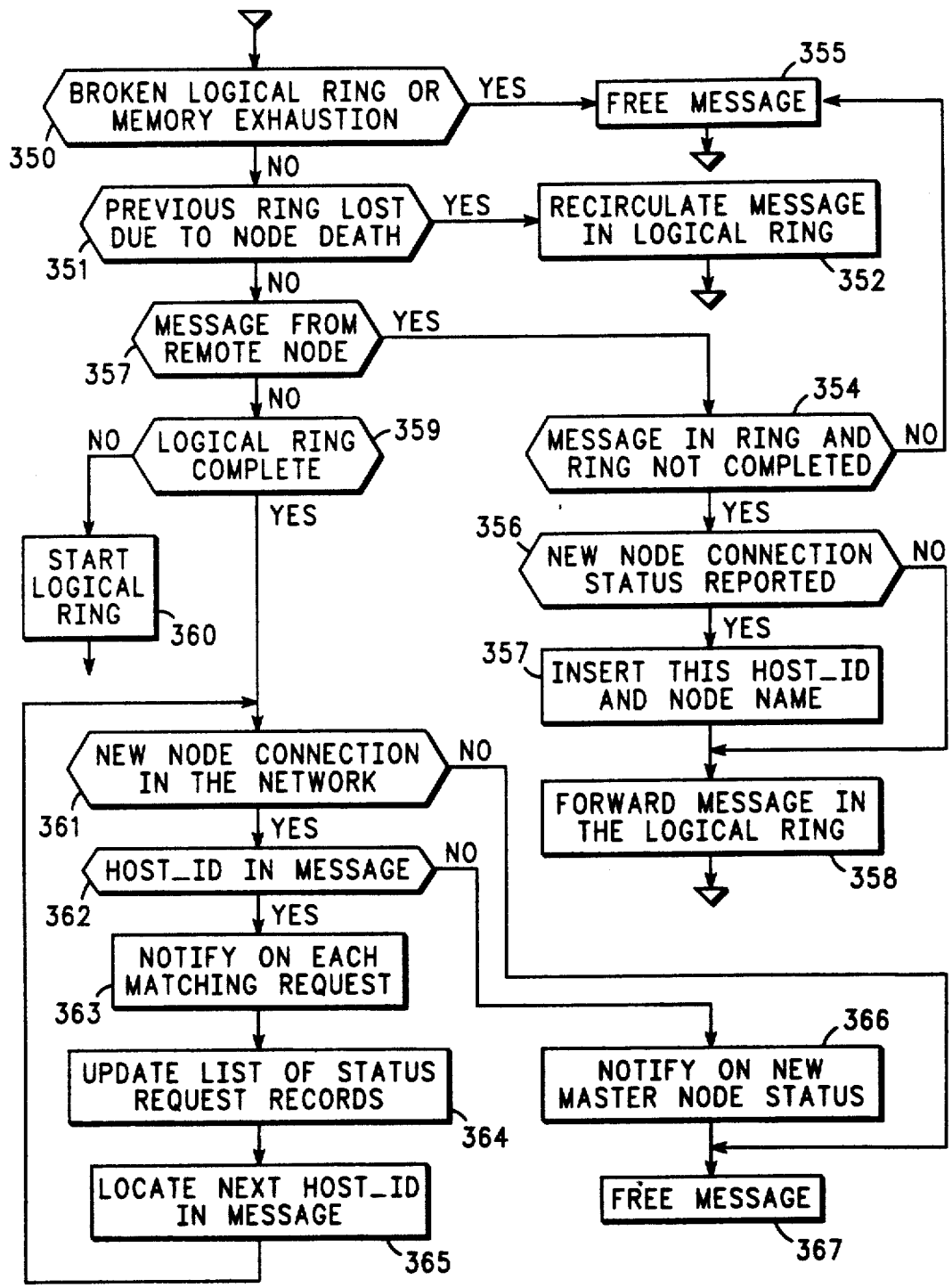
FIG. 13 shows a flow chart embodying the present invention for circulation of a status message.

In FIG. 13, a flow chart for the circulation of a status message in a network is illustrated. This routine commences at decision block 350 where it is determined whether there is a broken logical ring or memory exhaustion, lines 793-794 of Appendix A. If there is no broken logical ring or memory exhaustion, the routine moves to decision block 351 where a determination is made as to whether the previous ring was lost due to node death, line 798 of Appendix A. If the ring was lost due to node death, the routine moves to block 352 where the message is recirculated in the logical ring, line 799 of Appendix A. If the previous ring was not lost due to node death, block 798, the routine moves to decision block 353 where it is determined whether the message is from a remote node, line 803 of Appendix A. If the message is from a remote node, the resource moves to decision block 354 where it is determined whether the ring has been completed, line 804 of Appendix A. If the ring has not been completed, block 354, or if the logical ring has been broken or the memory exhausted, block 350, the routine moves to block 355 where the message is freed, or released, to circulate, line 795 or 815 of Appendix A.

If the message is in the ring and the ring has not been completed, decision block 354, the routine moves to decision block 356 where it is determined whether this is a new node connection status report, line 806 of Appendix A. If this is a new node connection status report, then the routine moves to block 357 where the host ID and nodename are inserted in the message, lines 7 and 808 of Appendix A. Following blocks 357 or if no new node connection status is reported, block 356, the routine moves to block 358 and the message forwarded in the logical ring, line 811 of Appendix A.

If the message is not from a remote node, decision block 353, the routine moves to decision block 359 where the process determines if the logical ring has been completed, line 819 of Appendix A. If the logical ring has not been completed, the routine moves to block 360 which starts the logical ring, lines 824-830 of Appendix A.

If the logical ring was completed, decision block 359, the routine moves to decision block 361 where it determines if a new node connection in the network is reported, line 832 of Appendix A. If a new node connection in the network is reported, the routine moves to decision block 362 where it determines whether a host ID is in the message, line 837 of Appendix A. If a host ID is in the message, the routine moves to block 364 where each matching request is notified of the status, lines 840 and 725-769 of Appendix A. Following block 363 is block 364 where the list of status request records is updated, lines 846 and 1196-1250 of Appendix A. Following block 364 is block 365 where the next host ID in the message is located, line 837 of Appendix A. Following block 365, the routine loops back to decision block 362 to see if a host ID is present in the message.

If there are no more host ID in the message, block 362, the routine moves to block 366 where the new master node status notification is made, line 849-852 of Appendix A. Following block 366 or if no new node connection is made in the network, block 361, the routine moves to block 367 where the message is freed, line 855 of Appendix A, which ends the routine.

Figure 14:
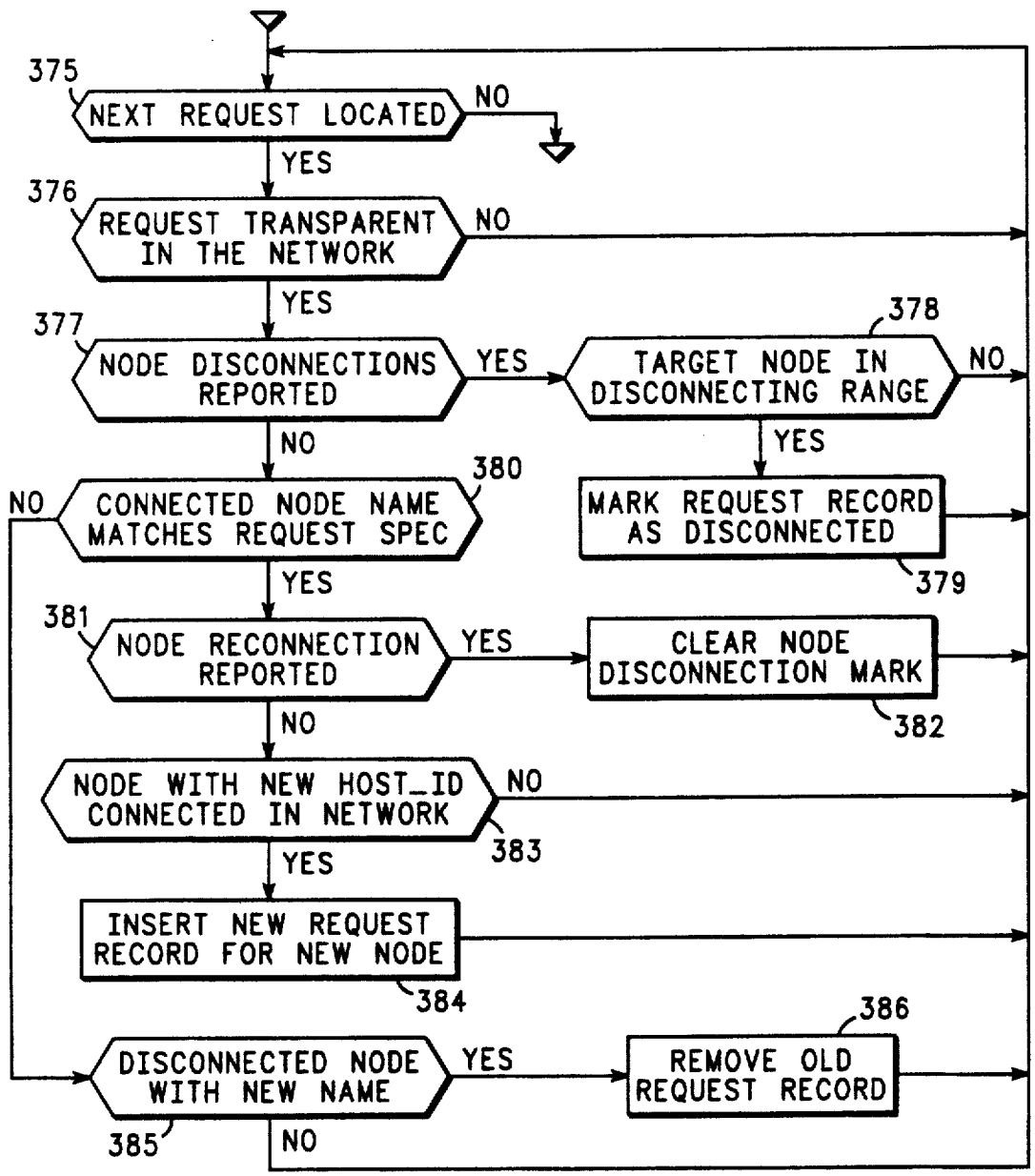
FIG. 14 shows a flow chart embodying the present invention for updating a status request record.

Referring now to FIG. 14, a routine for updating the list of status request records is illustrated. This routine is utilized in block 345 of FIG. 12 and 364 of FIG. 13. The process enters the routine at decision block 375 where it looks for the next request, line 1214 of Appendix A. If no next request is located, the process exits the routine. If a next request is located, the routine moves to decision block 376 where a determination is made as to whether the request is transparent in the network, line 1217 of Appendix A. If the request is not transparent, the routine loops back to decision block 375.

If the request is transparent, the routine moves to decision block 377 where a determination is made as to whether a node disconnection is being reported, line 1219 of Appendix A. If a node disconnection is being reported, the process moves to decision block 378 to see if the target node is in the range of the disconnected nodes, lines 1220-1221 of Appendix A. If the target node is not within the range of the disconnected nodes the decision loops back to decision block 375. If the target node is within the range of the disconnected nodes the process moves to block 379 where the request record is marked as disconnected, line 1222 of Appendix A. Following block 379 the routine loops back to decision block 375.

If no node disconnection is reported, decision block 377, the routine moves to decision block 380 where the connected nodename is matched with the requested specification, lines 1225-1226 of Appendix A. If the connected node name matches the request, the routine moves to decision block 381 where it determines if the node is being reconnected, line 1233 of Appendix A. If the node is being reconnected, the routine moves to block 382 where the node disconnected mark is cleared, line 1235 of Appendix A. Following block 382 the routine loops back to decision block 375.

If a node reconnection is not being reported, decision block 381, the routine moves to decision block 383 where the process checks to see if a node with a new host ID was connected to the network. If the host ID of the connected node is not new, then the routine loops back to decision block 375. If the host ID of the connected node is new, then the routine moves to decision block 384. In block 384 new request records are inserted for the new node, lines 1239 and 1257-1284 of Appendix A. Following block 384, the routine loops back to decision block 375.

If the connected node name does not match the requested name, decision block 380, the routine goes to decision block 385 to determine if a disconnected node with a new name is reconnected, lines 1242 and 1243 of Appendix A. If this node is a disconnected node with a new name, the routine moves to block 386 were the old request records are removed, lines 1244 and 495-514 of Appendix A. Following block 386 or if this reconnected node is not a disconnected node with a new node name, the routine loops back to decision block 375. This completes the updating of the status request records.

Thus, it will be apparent to one skilled in the art that there has been provided in accordance with the invention, a process and method that fully satisfy the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

Program Listing A

```
1    /*****************************************************************
2
3            (C) Copyright 1988.  All Rights Reserved.  Computer X, Inc.
4
5            Reproduction of this software by recipient in whole or
6            in part is forbidden except as provided in writing by
7            Computer X, Inc.
8
9            Module            : XMX  XIX
10           Date submitted    : XEX  XUX
11           Origin            : Computer X
12           Description       : Resource status traps
13
14   *****************************************************************
15
16   #ifndef lint
17   static char SrcId[] = "X2X XMX:XIX";
18   #endif
19
20   #include <cX.h>
21   #include <os/vers.h>
22   #include <os/kerntypes.h>
23   #include <errm.h>
24   #include <gen_codes.h>
25   #include <nim/nimkern.h>
26   #include "config.h"
27
28   /*****************************************************************
29        Set and Cancel Status Notification Requests for Nodes and Resources
30   *****************************************************************
31
32   void cnf_traps(h, c)
33   MSG_HANDLE *h;
34   CONNECTOR  *c;
35   {
36       extern void cpm_msg_rej();        /* reply with "failed"      */
37       extern void cm_bad_msg();
38       extern bool name_sync_cont();
39       extern bool valid_res();
40       extern bool cnf_cancel();
41       extern char *cfst_unmsg();
42       extern char *Get_string();
43       extern void cfst_free_sr();
44
45       extern STAT_REQ *stnot_lst;
46       extern long      this_cell;
47       extern char      config_mgt[];
48       extern char      DONE[];
49       extern char      FAILED[];
50
51       unsigned long *host;
52       STAT_REQ *this_req;
53       MSGINFO   msginfo;
54       CONNECTOR conn, *con;
55       char *s;
56       uint32 *lptr;
```

```
57          uint32 code;
58          uint32 str_len;
59          bool repl;
60          bool remote;
61          bool set;
62          bool found;
63
64          if (con = (CONNECTOR *) Get_triple(h, CONN, ))
65              if (!cm_conn_ok(h, CONN, &conn, &remote))
66                  return;
67              else if (remote) {
68                  cpm_rem_conn(h, c, &conn, _);
69                  return;
70              }
71              else if (!valid_res( (RES_ID *) CONN_CHAN(&conn)))
72                  cm_bad_msg("bad resource connector", h, c, FALSE);
73                  return;
74              }
75
76          if (!((this_req = (STAT_REQ *) ns_malloc(sizeof(STAT_REQ)))) {
77              cpm_msg_rej(h, cX_TOO_BIG, FALSE, FALSE);
78              return;
79          }
80
81          memset((char *) this_req, 0, sizeof(STAT_REQ));
82          if (Get_triple(h, STAT, ))
83              this_req->flags |= CFSR_RESOURCE;
84          else if (Get_triple(h, NODE, ))
85              this_req->flags |= CFSR_NODE;
86          else {
87              cm_bad_msg("missing option",h,c,FALSE);
88              cfst_free_sr(this_req);
89              return;
90          }
91
92          this_req->req_conn = *c;
93          if (con)
94              this_req->res_conn = *con;
95
96          if ((lptr = (uint32 *) Get_triple(h, CODE, _)) {
97              this_req->code = *lptr;
98              if (Get_triple(h, OFF, ))
99                  this_req->flags |= CFSR_OFF;
100         }
101
102         if ((lptr = (uint32 *) Get_triple(h, ID, _))
103             this_req->id = *lptr;
104
105         if (Get_triple(h, HOLD, ))
106             this_req->flags |= CFSR_HOLD;
107
108         if (!strcmp(h->msg_start, "set"))
109             set = TRUE;
110         else
111             set = FALSE;
112
113     Msg_info(h->msg_start, &msginfo);
114     if (!IN_RING(&msginfo))
115         this_req->tag = msginfo.tag;
116
117     if (Get_triple(h, RPLY, _))
118         repl = TRUE;
119     else {
120         repl = FALSE;
121         if (Get_triple(h, SYNC, _)) {
122             this_req->flags & CFSR_SYNC;
123             this_req->req_msg = h->msg_start;
124         }
125     }
126
127     if (this_req->flags & CFSR_RESOURCE)
128         if (s = Get_string(h, SUBS, _, &str_len))
129             if (str_len > MAXNAM - 1) {
130                 cpm_msg_rej(h, cX_LENGTH, FALSE, FALSE);
131                 free(this_req);
132                 return;
```

```
133                 )
134             else
135                 strcpy(this_req->subs, s);
136         else if (Get_triple(h, MICH, _))
137             if (!((this_req->to_match = cfst_unmsg(h, &msginfo))) {
138                 if (!repl)
139                     this_req->to_match = h->msg_start;
140                 else {
141                     cpm_msg_rej(h, cX_TOO_BIG, FALSE, FALSE);
142                     free(this_req);
143                     return;
144                 }
145             }
146             else
147                 this_req->flags |= CFSR_MATCH_NOMSG;
148
149     if (set) {
150         if (IN_RING(&msginfo) && (!RING_COMPLETE(&msginfo))) {
151             if ((Get_triple(h, NDTM, _))                              &&
152                 (host = (unsigned long *) Get_triple(h, HOST, _)) &&
153                 ((*host) == this_cell)                            ) {
154
155                 Forward(NEXT, _, h->msg_start);
156                 cfst_free_sr(this_req);
157                 return;
158             }
159         }
160         else {
161             this_req->next = stnot_lst;
162             stnot_lst      = this_req;
163         }
164     }
165
166     if (this_req->flags & CFSR_NODE) {
167         if (((!IN_RING(&msginfo)) &&
168              (lptr = (unsigned long *) Get_triple(h, HOST, _)))
169             this_req->host = *lptr;
170         else {
171             if (s = Get_string(h, NAME, _, &str_len))
172                 if (str_len > MAXFILE - 1) {
173                     cpm_msg_rej(h, cX_LENGTH, FALSE, FALSE);
174                     cfst_free_sr(this_req);
175                     return;
176                 }
177                 else
178                     strcpy(this_req->targ_name, s);
179
180                 if (set && (!name_sync_cont(h, c, this_req, &msginfo))) {
181                     cfst_free_sr(this_req);
182                     return;
183                 }
184             }
185         }
186         else if (s = Get_string(h, ORIG, _, &str_len))
187             if (str_len > MAXNAM - 1) {
188                 cpm_msg_rej(h, cX_LENGTH, FALSE, FALSE);
189                 cfst_free_sr(this_req);
190                 return;
191             }
192             else
193                 strcpy(this_req->targ_name, s);
194
195     found = FALSE;
196     if (!set) {
197         found = cnf_cancel(h, c, this_req);
198         if (this_req->flags & CFSR_MATCH_NOMSG)
199             free(this_req->to_match);
200         free(this_req);
201     }
202
203     if (repl    || ((!set) && (!found))) {
204         Alt_triple(h, ORIG, strlen(config_mgt) + 1, config_mgt);
205         Add_triple(h, REQ , strlen(h->msg_start) + 1, h->msg_start);
206
207         if (found || set)
208             strcpy(h->msg_start, DONE);
209         else {
210             strcpy(h->msg_start, FAILED);
211             code = cX_NOT_FOUND;
```

```
                    Add_triple(h, CODE, sizeof(unsigned long), (char *) &code);
                    }

Reply(h->msg_start, h->msg_start);
                } else if (!(this_req->flags & CFSR_SYNC))
                free(h->msg_start);
        } static void     cfst_free_sr(r)
    STAT_REQ *r;
    {
    extern STAT_REQ *stnot_lst;

if (stnot_lst == r)
        stnot_lst = r->next;

if (r->flags & CFSR_MATCH_NOMSG)
        free(r->to_match);

free(r);
    }

/*
    remove triples not to match (called if resource match requested)
    and copy a message into an alloced structure
*/ static char *cfst_unmsg(h, minfo)
MSG_HANDLE *h;
MSGINFO *minfo;
{
    extern char *cfsn_clone_msg();

char    *m;

Del_triple(h, STAT);
    Del_triple(h, MTCH);
    Del_triple(h,  ID);
    Del_triple(h, RPLY);
    Del_triple(h, SYNC);
    Del_triple(h, HOLD);

if (m = cfsn_clone_msg(h->msg_start, minfo))
        *((unsigned long *) m) = NULL;

return(m);
}

/*
    check if a pointer points in the resource list of the node
*/ bool valid_res(rs_msg)
RES_HD *rs_msg;
{
    extern char *res_lst;

RES_HD *rh;

rh = (RES_HD *) res_lst;
    while(rh)
        if (rh == rs_msg)
            return(TRUE);
        else
            rh = rh->nxt_res;

return(FALSE);
    }

/*
            This is to make sure that transparent node status notification requests
            are set for every matching host. Transparent requests are specified by
            transparent, non-unique nodename or for all hosts of the network. Retur TRUE  - if continue to reply the request  (end of ring)
            FALSE - no more actions on this node (message forwarded)
```

```
        */ static bool     name_sync_cont(h, c, sr, msginfo)
MSG_HANDLE *h;
CONNECTOR *c;
STAT_REQ  *sr;
MSGINFO *msginfo;
{
        extern void cm_bad_msg();
        extern bool store_all_ndreq();
        extern void remove_sr();

extern long this_cell;
        extern char *loc_nodename;

if (IN_RING(msginfo)) { if (TRANSMISSION_FAILED(msginfo) == BROKEN_LRING)
                cm_bad_msg("nodetrap lri disconnected", h, c, FALSE);
            else if (TRANSMISSION_FAILED(msginfo) == NODE_DEATH) {
                Alt_triple(h, NDTH, _, _);
                Forward(LRING, _, h->msg_start);
            }
            else {
                if ((!sr->targ_name[0]) || (!strcmp(sr->targ_name, loc_nodename
                    Add_triple(h, HOST, sizeof(unsigned long), &this_cell);
                    Add_triple(h, NDNM, strlen(loc_nodename) + 1, loc_nodename)
                } if ((!(RING_COMPLETE(msginfo))) &&
                    (TRANSMISSION_FAILED(msginfo) != FAILED_DELIVERY))
                    Forward(NEXT, _, h->msg_start);
                else if (store_all_ndreq(h, sr))
                    return(TRUE);
            }
        }
        else if (!IS_THIS_NODE(c))
            cm_bad_msg("illegal remote nodetrap", h, c, FALSE);
        else
            Forward(LRING, _, h->msg_start);

return(FALSE);
}

/*
        After discovering all matching nodes, duplicate the request structure
        for each of them and include them in the link list
*/ static bool store_all_ndreq(h, sr)
MSG_HANDLE *h;
STAT_REQ  *sr;
{
    extern STAT_REQ *stnot_lst;
    extern void cpm_msg_rej();
    extern char *Nxt_attr();
    extern void rem_dupreqs();

MSG_HANDLE hname;
    unsigned long *h_id;
    STAT_REQ *more_req;
    char *ndnm;

sr->mast_id = sr;
    sr->flags  |= CFSR_TRANSP;
    if (sr->flags & CFSR_SYNC)
        sr->req_msg = h->msg_start;

Ini_handle(&hname, h->msg_start, _, SUSP | FIX);
    while (h_id = (unsigned long *) Nxt_attr(&hname, HOST)) {
        if (!(more_req = (STAT_REQ *) ns_malloc(sizeof(STAT_REQ)))) {
            cpm_msg_rej(h, cx_TOO_BIG, FALSE, FALSE);
            rem_dupreqs(sr);
            return(FALSE);
        }
        else {
            *more_req = *sr;
```

```
367                 more_req->host = *h_id;
368                 if (ndnm = Nxt_attr(&hname, NDNM))
369                     strcpy(more_req->targ_name, ndnm);
370
371                 more_req->last_code = cX_AVAILABLE;
372                 more_req->next = stnot_lst;
373                 stnot_lst      = more_req;
374                 }
375         }
376
377     return(TRUE);
378 }
379
380 /*
381     Undo building list of requests with same name if can't complete
382 */
383
384 static void rem_dupreqs(sr)
385 STAT_REQ *sr;
386 {
387     extern void cfst_free_sr();
388
389     extern STAT_REQ *stnot_lst;
390
391     STAT_REQ *srnext;
392
393         while (stnot_lst != sr) {
394             srnext = stnot_lst->next;
395             free(stnot_lst);
396             stnot_lst = srnext;
397             }
398
399     cfst_free_sr(sr);
400 }
401
402 /******************************************************************
403         Cancel Status Notification Requests for Nodes and Resources
404 ******************************************************************/
405
406 static bool    cnf_cancel(h, c, cr)
407 MSG_HANDLE *h;
408 CONNECTOR  *c;
409 STAT_REQ   *cr;
410 {
411         extern bool cnf_trp_mtch();
412         extern void remove_sr();
413
414         extern STAT_REQ *stnot_lst;
415
416         STAT_REQ *sri, *srp, *srn;
417         bool tagged, found, next;
418         CONNECTOR *who;
419         uint32 trpl_size;
420
421         if (Get_triple(h, TAG, _))
422             tagged = TRUE;
423         else
424             tagged = FALSE;
425
426         if ((who = (CONNECTOR *) Get_triple(h, WHO, &trpl_size)) &&
427                                         (trpl_size == sizeof(CONNECTOR)))
428             cr->req_conn = *who;
429
430         found = FALSE;
431         sri = stnot_lst;
432         srp = NULL;
433
434         if (Get_triple(h, NeXT, _))
435             next = TRUE;
436         else
437             next = FALSE;
438
439         while (sri) {
440             srn = sri->next;
441             if (
442                 ((!CONN_PROCID(&cr->req_conn)) ||
443                         CONN_EQ(&cr->req_conn, &sri->req_conn)) &&
444                  CONN_EQ(&cr->res_conn, &sri->res_conn)        &&
445                 ((!(cr->targ_name[0]))                         ||
446                  (!strcmp(sri->targ_name, cr->targ_name))      ) &&
```

```
447                     (!strcmp(sri->subs,    cr->subs))          &&
448                     (sri->code == cr->code) && (sri->id == cr->id) &&
449                 ((!tagged) || (sri->tag == cr->tag))           &&
450                 ((!cr->host) || (cr->host == sri->host))       &&
451                 (((!sri->to_match) && (!cr->to_match)) ||
452                             cnf_trp_mtch(sri, cr))
453             ) {
454
455                 found = TRUE;
456                 remove_sr(sri, srp);
457                 sri = srp;
458
459                 if (next)
460                     break;
461             }
462
463         srp = sri;
464         sri = srn;
465         }
466
467     return(found);
468 }
469
470 /*
471     Invoke resource match routine (common with "query" request)
472 */
473
474 static bool cnf_trp_mtch(s1, s2)
475 STAT_REQ *s1;
476 STAT_REQ *s2;
477 {
478     extern bool res_match();
479
480     MSG_HANDLE h1, h2;
481
482     if ((!(s1->to_match)) || (!(s2->to_match)))
483         return(FALSE);
484     else {
485         Ini_handle(&h1, s1->to_match, _, SUSP | NOFIX);
486         Ini_handle(&h2, s2->to_match, _, SUSP | NOFIX);
487         return(res_match(&h1, &h2));
488         }
489 }
490
491 /*
492     Remove a status notification request
493 */
494
495 static void remove_sr(sr, srp)
496 STAT_REQ *sr;                   /*   status request to remove           */
497 STAT_REQ *srp;                  /*   previous, NULL if stnot_lst == sr  */
498 {
499     extern STAT_REQ *stnot_lst;
500
501     STAT_REQ *sri;
502
503     if (srp)
504         srp->next = sr->next;
505             else
506                 stnot_lst = sr->next;
507
508             if (sr->flags & CFSR_MATCH_NOMSG)
509                 free(sr->to_match);
510
511             if (sr->req_msg)
512                 free(sr->req_msg);
513
514             free(sr);
515 }
516
517 /*****************************************************************
518         Act on Status Notifications Sent by the NIM or by the Resource Servers
519 *****************************************************************
520
521 void cnf_status(h, c)
522 MSG_HANDLE *h;
523 CONNECTOR *c;
```

```
524     (
525             extern void cfst_stat_not();
526             extern void cfst_upd_req();
527             extern void cm_bad_msg();
528             extern bool nimstat_ring();
529             extern bool valid_res();
530             extern bool bad_nimstat();
531             extern char *Get_string();
532             extern void self_restarted();
533
534             extern long this_cell;
535
536             MSGINFO msginfo;
537             uint32 *stat, new_code;
538             uint32 str_len;
539             long size;
540             STAT_NOT s;
541             char *sp;
542             bool forw;
543             bool nm_too_long;
544
545             memset((char *) &s, 0, sizeof(STAT_NOT));
546
547             if ((!(stat = (uint32 *) Get_triple(h, CODE, &size))) ||
548                                             (size != sizeof(unsigned long)))
549                 cm_bad_msg("no or bad size of code in status message", h, , FALSE)
550                 return;
551                 )
552
553             else (
554                 s.code = *stat;
555                 nm_too_long = FALSE;
556                 if (sp = Get_string(h, SUBS, _, &str_len))
557                     if (str_len > MAXNAM)
558                         nm_too_long = TRUE;
559                     else
560                         strcpy(s.code_subs, sp);
561
562         if (sp = Get_string(h, ORIG, _, &str_len))
563             if (str_len > MAXNAM)
564                 nm_too_long = TRUE;
565             else
566                 strcpy(s.orig, sp);
567
568         if (nm_too_long) (
569             cm_bad_msg("too long proc name in status msg", h, c, FALSE);
570             return;
571             )
572         )
573
574 if (bad_nimstat(h, c, &s))
575     return;
576
577 Msg_info(h->msg_start, &msginfo);
578 if (((!IS_THIS_NODE(c)) &&
579     (((s.flags & CFSN_NIM)) || (!IN_RING(&msginfo)))) (
580     cm_bad_msg("remote call", h, c, FALSE);
581     return;
582     )
583
584 if ((   CONN_HOSTID(c) == this_cell                  )   &&
585     (!((s.flags & CFSN_NIM) && (s.code == cX_MASTER)))   &&
586     (!((s.flags & CFSN_NIM) && (!(s.flags & CFSN_SELF)))) &&
587     valid_res((RES_HD *) msginfo.tag)                    &&
588     (((RES_HD *) msginfo.tag)->ntfpid == CONN_PROCID(c)) ) (
589
590     s.flags |= CFSN_RES_TAG;
591     Ini_handle(&s.resh, msginfo.tag, _, SUSP|FIX);
592
593     stat = (uint32 *) Get_triple(&s.resh, STAT, _);
594     if ((s.flags & CFSN_NIM ) &&
595         (s.flags & CFSN_SELF) && (s.code == cX_UNAVAILABLE)) (
596         if ((*stat) != cX_AVAILABLE) (
597             Free(h->msg_start);
598             return;
599             )
600         )
601
```

```
        if ((s.code == cX_RESTARTED) && ((*stat) == cX_AVAILABLE) &&
                                          (s.flags & CFSN_NIM))
            new_code = 0;
        else
            new_code = s.code;

if ((s.flags & CFSN_NIM) && (s.code == cX_AVAILABLE) &&
                                          ((*stat) == cX_RESTARTED))
            self_restarted(h, c, &s, &msginfo);
        )

if (s.flags & CFSN_NIM)
        forw = nimstat_ring(h, c, &s, &msginfo);
    else
        forw = FALSE;

if (forw || (!(s.flags & CFSN_NIM)))
            cfst_stat_not(c, &s);

/*  cfst_stat_not checked the current status for the 'off' option, so
        only now we can update the current status                        */ if ((s.flags & CFSN_RES_TAG) && new_code)
            *stat = new_code;

if ( (s.flags & CFSN_NIM) &&
            ((s.code == cX_AVAILABLE) || (s.code == cX_UNAVAILABLE)))
            cfst_upd_req(c, &s);

if (!(s.flags & CFSN_NIM))
            Free(h->msg_start);
    )

static void     self_restarted(h, c, s0, minfo)
    MSG_HANDLE *h;
    CONNECTOR *c;
    STAT_NOT *s0;
    MSGINFO *minfo;
    {
        extern bool nimstat_ring();
        extern char *cfsn_clone_msg();

STAT_NOT s;
        char *m;
        MSG_HANDLE h0;
        uint32 *code;

if (m = cfsn_clone_msg(h->msg_start, minfo)) {
            s = *s0;
            s.code = cX_RESTARTED;
            Ini_handle(&h0, m, _, FIX | SUSP);
            code = (uint32 *) Get_triple(&h0, CODE, _);
            *code = cX_RESTARTED;
            s.flags |= CFSN_CLONED;
            nimstat_ring(&h0, c, &s, minfo);
            )
    )

static char     *cfsn_clone_msg(msg, msginfo)
    char *msg;
    MSGINFO *msginfo;
    {
        char    *m;

if (!(m = Alloc(msginfo->size, FALSE)))
            return(NULL);
        else {
            memcpy(m, msg, msginfo->size);
            Msg_parm(m, msginfo->tag);
            return(m);
            )
    )

/*
    Check if legitimate status message from the NIM
*/
```

```
679     static bool bad_nimstat(h, c, s)
680     MSG_HANDLE *h;
681     CONNECTOR *c;
682     STAT_NOT *s;
683     {
684         extern void cm_bad_msg();
685
686         extern char nim_name[];
687         extern char *loc_nodename;
688         extern long this_cell;
689         extern PCB *nimproc;
690         extern CONNECTOR cm_ownconn;
691
692         unsigned long *fi, *li;
693         char *sp;
694
695         if (s->orig[0] && (!strcmp(s->orig, nim_name)))
696
697             if (IS_THIS_NODE(c) && (CONN_PROCID(c) != PCB_PID(nimproc))
698                                         && (!CONN_EQ(c, &cm_ownconn))) {
699                 cm_bad_msg("illegal nim status msg", h, c, FALSE);
700                 return(TRUE);
701             }
702             else {
703                 s->flags |= CFSN_NIM;
704                 if (Get_triple(h, SELF, _)) {
705                     s->flags |= CFSN_SELF;
706                     if (IS_THIS_NODE(c))
707                         strcpy(s->nodename, loc_nodename);
708                     else if (sp = Get_string(h, NAME, _, _))
709                         strcpy(s->nodename, sp);
710                 }
711                 else if ((fi = (unsigned long *) (Get_triple(h, FRST, _))) &&
712                          (li = (unsigned long *) (Get_triple(h, LAST, _)))   )
713                     s->frst_nodeid = *fi;
714                     s->last_nodeid = *li;
715                 }
716             }
717
718         return(FALSE);
719     }
720
721     /*
722      *  Traverse request list if status change to be reported
723      */
724
725     static void cfst_stat_not(c, s)
726     CONNECTOR *c;
727     STAT_NOT *s;
728     {
729         extern STAT_REQ *resolve_ndtrap();
730         extern STAT_REQ *stnot_by_resmtch();
731         extern STAT_REQ *stnot_by_resconn();
732         extern STAT_REQ *stnot_by_notmsg();
733
734         extern STAT_REQ *stnot_lst;
735
736         STAT_REQ *sr, *srp, *srn, *srnn;
737         RES_HD  *tag;
738         bool server_notif;
739
740         sr  = stnot_lst;
741         srp = NULL;
742
743         if (((RES_HD *) s->resh.msg_start)->ntfpid == (CONN_PROCID(c))
744             server_notif = TRUE;
745         else
746             server_notif = FALSE;
747
748         while (sr) {
749             srn = sr->next;
750             if ((sr->flags & CFSR_NODE) && (s->flags & CFSN_NIM))
751                 srnn = resolve_ndtrap(sr, c, s, &srp);
752             else if ((sr->to_match) && (s->flags & CFSN_RES_TAG) && se ver_noti
753                 srnn = stnot_by_resmtch(sr, c, s, &srp);
754             else if ((CONN_PROCID(&sr->res_conn)) && (s->flags & CFSN_ ES_TAG)
755                     (CONN_CHAN(&sr->res_conn) == (unsigned long)
756                                                     (s->resh.msg_ tart)) &
757                                                             se ver_noti
758                 srnn = stnot_by_resconn(sr, c, s, &srp);
```

```
759                 else if ((!(sr->flags & CFSR_NODE))       &&
760                         (!(CONN_PROCID(&sr->res_conn))) && ((!(sr->to_match))))
761                     srnn = stnot_by_notmsg(sr, c, s, &srp);
762                 else
763                     srnn = srn;
764
765                 sr = srnn;
766                 }
767
768         return;
769     }
770
771     /*      returns TRUE  If status notification has been forwarded and
772                                 processing is required on local node
773                     FALSE if end of logical ring                        */
774
775     static bool     nimstat_ring(h, c, s, minfo)
776     MSG_HANDLE *h;
777     CONNECTOR *c;
778     STAT_NOT *s;
779     MSGINFO *minfo;
780     {
781         extern void cfst_stat_not();
782         extern void cfst_upd_req();
783
784         extern long this_cell;
785      extern char *loc_nodename;
786
787     CONNECTOR h_c;
788     unsigned long *hid, hid_max;
789     MSG_HANDLE h1;
790     char mast_name[MAXNAM];
791
792     if (IN_RING(minfo))
793         if ((TRANSMISSION_FAILED(minfo) == BROKEN_LRING) ||
794             (TRANSMISSION_FAILED(minfo) == FAILED_DELIVERY)) {
795             free(h->msg_start);
796             return(FALSE);
797             }
798         else if (TRANSMISSION_FAILED(minfo) == NODE_DEATH) {
799             Forward(LRING, _, h->msg_start);
800             return(FALSE);
801             }
802
803     if ((!IS_THIS_NODE(c))
804         if ((!RING_COMPLETE(minfo)) && IN_RING(minfo)) {
805
806             if ((s->flags & CFSN_SELF) && (s->code == cX_AVAILABLE)) {
807                 Add_triple(h, HOST, sizeof(this_cell), (char *) &this_cell
808                 Add_triple(h, NDNM, strlen(loc_nodename) + 1, loc_nodename
809                 }
810
811             Forward(NEXT, _, h->msg_start);
812             return(TRUE);
813             }
814         else {
815             free(h->msg_start);
816             return(FALSE);
817             }
818
819     else if (!RING_COMPLETE(minfo)) {
820
821         if ((s->flags & CFSN_SELF) && (s->code != cX_UNAVAILABLE))
822             Add_triple(h, NAME, strlen(loc_nodename) + 1, loc_nodename);
823
824         if (s->flags & CFSN_CLONED)
825             Put(LRING, _, h->msg_start);
826         else
827             forward(LRING, _, h->msg_start);
828
829         return(TRUE);
830         }
831     else {
832         if ((s->flags & CFSN_SELF) && (s->code == cX_AVAILABLE)) {
833
834             hid_max = 0;
835             CONN_NULL(&h_c);
```

```
836                    Ini_handle(&h1, h->msg_start, _, SUSP | FIX);
837                    while (hid = (unsigned long *) Nxt_attr(&h1, HOST)) {
838                        CONN_HOSTID(&h_c) = *hid;
839                        strcpy(s->nodename, Nxt_attr(&h1, NDNM));
840                        cfst_stat_not(&h_c, s);
841                            if ((*hid) > hid_max) {
842                                hid_max = *hid;
843                                strcpy(must_name, s->nodename);
844                            }
845
846                            cfst_upd_req(&h_c, s);
847                        }
848
849                        CONN_HOSTID(&h_c) = hid_max;
850                        s->code = cX_MASTER;
851                        strcpy(s->nodename, must_name);
852                        cfst_stat_not(&h_c, s);
853                    }
854
855                    Free(h->msg_start);
856                    return(FALSE);
857                }
858            }
859
860        /*      if node status notification request found :                */
861
862        static STAT_REQ *resolve_ndtrap(sr,    c, s, srp)
863        STAT_REQ   *sr;
864        CONNECTOR  *c;
865        STAT_NOT   *s;
866        STAT_REQ   **srp;
867        {
868            extern STAT_REQ *stnot_put();
869            extern bool new_name_mtch();
870            extern bool host_in_range();
871            extern bool cfst_code_mtch();
872
873            extern char config_mgt();
874
875            uint32 *stat;
876            CONNECTOR conn;
877            bool code_mtch;
878
879            if (((s->flags & CFSN_SELF) && ((sr->host) &&
880                  (s->code != cX_UNAVAILABLE) && (sr->host != CONN_HOSTID(c)))) ||
881                ((!(s->flags & CFSN_SELF)) && ((sr->host) &&
882                  (host_in_range(sr->host, s->last_nodeid, s->frst_nodeid)))  ||
883                ((sr->flags & CFSR_TRANSP) && (!sr->host) &&
884                        (!new_name_mtch(c, sr, s)))                               )
885
886                return(sr->next);
887
888            else {
889                if (sr->host)
890                    if (sr->last_code == s->code)
891                        return(sr->next);
892
893                code_mtch = cfst_code_mtch(sr, s);
894                if ((s->code != cX_RESTARTED) && (s->code != cX_MASTER))
895                    sr->last_code = s->code;
896
897            if (code_mtch) {
898                CONN_NULL(&conn);
899                if ((s->flags & CFSN_SELF) && (s->code != cX_UNAVAILABLE))
900                    CONN_HOSTID(&conn) = CONN_HOSTID(c);
901                else
902                    CONN_HOSTID(&conn) = sr->host;
903                return(stnot_put(s, sr, config_mgt, &conn, srp));
904            }
905            else
906                return(sr->next);
907            }
908        }
909
910    /*
911        Check if host id Out Of a Range specified by its 1st and last value
912
```

```
        if nodeid diffr in range => node death => check nodeid range
        else                     => cpu  death =>
                        if on same node => check cpuid range
                        else            => out of range
*/ static bool host_in_range(t, l, f)
unsigned long t, l, f;
{
    CONNECTOR targ, frst, last;

CONN_HOSTID(&targ) = t;
    CONN_HOSTID(&frst) = f;
    CONN_HOSTID(&last) = l;

if ((CONN_NODEID(&frst)) != CONN_NODEID(&last))
        return(!beyond(
            CONN_NODEID(&targ), CONN_NODEID(&last), CONN_NODEID(&frst)));
    else if ((CONN_NODEID(&targ)) == CONN_NODEID(&last))
        return(!beyond(
            CONN_CPUID(&targ), CONN_CPUID(&last), CONN_CPUID(&frst)));
    else
        return(FALSE);
}

/*
    If status notification requested for resources specified by connector
*/ static STAT_REQ *stnot_by_resconn(sr, c, s, srpp)
STAT_REQ    *sr;
CONNECTOR   *c;
STAT_NOT    *s;
STAT_REQ    **srpp;
{
    extern bool cfst_code_mtch();
    extern STAT_REQ *stnot_put();

STAT_REQ *sn;

if ((cfst_code_mtch(sr, s)) && (!strcmp(sr->subs, s->code_subs)))
                sn = stnot_put(s, sr, s->orig, &sr->res_conn, srpp);
            else
                sn = sr->next;

sr->last_code = s->code;
            return(sn);
    } static bool    cfst_code_mtch(sr, s)
    STAT_REQ    *sr;
    STAT_NOT    *s;
    {
            uint32 *stat;

if (sr->code)
                if (s->code == sr->code)
                    if (!(sr->flags & CFSR_OFF))
                        return(TRUE);
                    else
                        return(FALSE);
                else
                    if (!(sr->flags & CFSR_OFF))
                        return(FALSE);
                    else if (s->flags & CFSN_RES_TAG) {
                        stat = (uint32 *) Get_triple(&s->resh, STAT, _);
                        if (sr->code == (*stat))
                            return(TRUE);
                        else
                            return(FALSE);
                    }
                    else if (sr->code == sr->last_code)
                        return(TRUE);
                    else
                        return(FALSE);
            else
                return(TRUE);
    }

/*
```

```
993                         if status notification requested by matching status message content
994             */
995
996             static STAT_REQ *stnot_by_notmsg(sr, c, s, srpp)
997             STAT_REQ   *sr;
998             CONNECTOR  *c;
999             STAT_NOT   *s;
1000            STAT_REQ   **srpp;
1001            {
1002                    extern STAT_REQ *stnot_put();
1003
1004                    if ((sr->code && (s->code != sr->code))  ||
1005                        (strcmp(sr->subs, s->code_subs))     ||
1006                        (strcmp(sr->targ_name, s->orig))       )
1007
1008                        return(sr->next);
1009
1010                else
1011                    return(stnot_put(s, sr, s->orig, c, srpp));
1012            }
1013
1014            /*
1015                if status notification requested for resources with matching content
1016            */
1017
1018            static STAT_REQ *stnot_by_resmtch(sr, c, s, srpp)
1019            STAT_REQ   *sr;
1020            CONNECTOR  *c;
1021            STAT_NOT   *s;
1022            STAT_REQ   **srpp;
1023            {
1024                extern bool res_match();
1025                extern STAT_REQ *stnot_put();
1026
1027                extern CONNECTOR cm_ownconn;
1028
1029                CONNECTOR conn;
1030                MSG_HANDLE mh;
1031
1032                Ini_handle(&mh, sr->to_match, _, SUSP | NOFIX);
1033                if (!res_match(&s->resh, &mh))
1034                    return(sr->next);
1035                else {
1036                    conn        = cm_ownconn;
1037                    CONN_CHAN(&conn) = (long) s->resh.msg_start;
1038                    return(stnot_put(s, sr, s->orig, &conn, srpp));
1039                    }
1040            }
1041
1042            /*
1043                build and send status notification message
1044            */
1045
1046            static STAT_REQ *stnot_put(s, sr, orig, conn, srp)
1047            STAT_NOT   *s;
1048            STAT_REQ   *sr;
1049            char       *orig;
1050            CONNECTOR  *conn;
1051            STAT_REQ   **srp;
1052            {
1053                extern void remove_sr();
1054                extern char STATUS[];
1055
1056                MSG_HANDLE noth;
1057                STAT_REQ   *sri, *srn, *srpp;
1058                bool last, hold;
1059                char missed[10];
1060
1061                if (!Ini_msg(¬h, STATUS, MINSIZE + 15 * KEYSIZE + sizeof(CONNECTOR)
1062                        strlen(sr->targ_name)+1 + 3*sizeof(long) + 2*MAXHAM + MAXFILE
1063                        strlen("node") + strlen("status") + 2, NOSUSP | FIX       ))
1064                    sr->flags |= CFSR_STAT_MISD;
1065                        return(NULL);
1066                        }
1067
1068                    if ((sr->flags & CFSR_NODE) && (s->flags &CFSN_NIM)) {
1069                        if (sr->targ_name[0])
1070                            Add_triple(¬h, NAME, strlen(sr->targ_name)+1, sr->targ_name)
```

```
                    else
                        Add_triple(¬h, NAME, strlen(s->nodename)+1,   s->nodename);

Add_triple(¬h, NODE,                      _,          _);
                    )
                else
                    Add_triple(¬h, STAT,                      _,          _);

if ((sr->flags & CFSR_NODE) || (sr->res_conn) || (sr->to_match))
                    Add_triple(¬h, CONN, sizeof(CONNECTOR), conn);

if (!(sr->flags & CFSR_OFF))
                    Add_triple(¬h, CODE, sizeof(uint32), &s->code );
                else {
                    Add_triple(¬h, CODE, sizeof(uint32), &sr->code );
                    Alt_triple(¬h, STAT, sizeof(uint32), &s->code );
                    Add_triple(¬h, OFF ,                 _,        _);
                    )

Add_triple(¬h, REQ ,                 4, "set"  );

if (orig && (*orig))
                    Add_triple(¬h, ORIG, strlen(orig) + 1, orig);
                if (*(s->code_subs))
                    Add_triple(¬h, SUBS, strlen(s->code_subs) + 1, s->code_subs);

if (sr->flags & CFSR_NODE_MISD) {
                    sr->flags &= ~CFSR_NODE_MISD;
                    strcpy(missed, "node");
                    Alt_triple(¬h, MISD, strlen(missed) +1, missed);
                    )

if (sr->flags & CFSR_STAT_MISD) {
                    sr->flags &= ~CFSR_STAT_MISD;
                    strcpy(missed, "status");
                    Add_triple(¬h, MISD, strlen(missed) +1, missed);
                    )

if (sr->flags & CFSR_SYNC)
                    Reply(sr->req_msg, noth.msg_start);
                else
                    Put(DIRECT, &sr->req_conn, noth.msg_start);

if (sr->flags & CFSR_HOLD)
                    hold = TRUE;
                else
                    hold = FALSE;

srn = sr->next;
                if (!(sr->flags & CFSR_TRANSP)) {
            if (!hold) {
                remove_sr(sr, *srp);
                srpp = *srp;
                )
            else
                srpp = sr;
            )
        else if ((s->flags & CFSN_SELF) && (s->flags & CFSN_NIM) &&
                (sr->flags & CFSR_NODE) && (s->code == cX_UNAVAILABLE)
                                && (sr->next != sr->mast_id)   )
            srpp = sr;

else {
            sri = stnot_lst;
            srpp = NULL;
            while (sri->mast_id != sr->mast_id) {
                srpp = sri;
                sri = sri->next;
                )

do {
                last = (sri->mast_id == sri);
                srn = sri->next;
                if (!hold)
                    remove_sr(sri, srpp);
                else
                    srpp = sri;
                sri = srn;
                ) while (!last);
```

```
1151            )
1152
1153        *srp = srpp;
1154        return(srn);
1155    )
1156
1157    /*
1158        Check if the node with matching name has not resulted in status
1159        notification for the same request
1160    */
1161
1162    static bool new_name_match(c, sr, s)
1163    CONNECTOR  *c;
1164    STAT_REQ   *sr;
1165    STAT_NOT   *s;
1166    {
1167        extern STAT_REQ *stnot_lst;
1168
1169        STAT_REQ *sri;
1170
1171        if ((s->nodename[0])                            &&
1172            (sr->mast_id == sr)                         &&
1173            (((!(sr->targ_name[0])) ||
1174             (!strcmp(s->nodename, sr->targ_name)))    &&
1175            ((s->code == cX_AVAILABLE) || (s->code == cX_RESTARTED))) {
1176
1177                sri = stnot_lst;
1178                while (sri != sr) {
1179                    if ((sri->mast_id == sr) &&
1180                        (sri->host == CONN_HOSTID(c))           )
1181                            return(FALSE);
1182                    else
1183                        sri = sri->next;
1184                }
1185
1186                return(TRUE);
1187            )
1188        else
1189            return(FALSE);
1190    )
1191
1192    /*
1193        Update the Request Queue if Node Status Change is Reported
1194    */
1195
1196    static void    cfst_upd_req(c, s)
1197    CONNECTOR  *c;
1198    STAT_NOT   *s;
1199    {
1200        extern void remove_sr();
1201        extern void insert_sr();
1202        extern bool host_in_range();
1203
1204        extern STAT_REQ *stnot_lst;
1205
1206        STAT_REQ *sr, *psr, *new_sr;
1207        STAT_REQ *mastid_curr, *next;
1208        bool host_found;
1209
1210        psr = (STAT_REQ *) NULL;
1211        mastid_curr = (STAT_REQ *) NULL;
1212        host_found = FALSE;
1213        sr = stnot_lst;
1214        while (sr) {
1215
1216            next = sr->next;
1217            if (sr->flags & CFSR_TRANSP)
1218
1219                if (s->code == cX_UNAVAILABLE) {
1220                    if ((sr->host) &&
1221                        (host_in_range(sr->host, s->last_nodeid, s->frst_nodeid)
1222                        sr->flags |= CFSR_HOST_OFF;
1223                    )
1224
1225                    else if (((!sr->targ_name[0]) ||
1226                              (!strcmp(sr->targ_name, s->nodename))) {
1227
1228                        if (sr->mast_id != mastid_curr) {
1229                            mastid_curr = sr->mast_id;
1230                            host_found = FALSE;
```

```
                        )
                if (sr->host == CONN_HOSTID(c)) {
                    host_found = TRUE;
                    sr->flags &= -CFSR_HOST_OFF;
                    } if ((sr->mast_id == sr) && (!sr->code) && (!host_found))
                    insert_sr(sr, psr, c, s);
                }
            else if ((sr->flags & CFSR_HOST_OFF) &&
                     (sr->host == CONN_HOSTID(c))   )
                remove_sr(sr, psr);

psr = sr;
        sr  = next;
        } return;
}

/*
    insert a new status request
*/ static void insert_sr(sr, psr, c, s)
STAT_REQ *sr;
STAT_REQ *psr;
CONNECTOR *c;
STAT_NOT *s;
{
    extern STAT_REQ *stnot_lst;

STAT_REQ *new_sr;

if (new_sr = (STAT_REQ *) ns_malloc(sizeof(STAT_REQ))) {

*new_sr = *sr;
            new_sr->host = CONN_HOSTID(c);
            if (!sr->targ_name[0])
                strcpy(new_sr->targ_name, s->nodename);

if (!psr) {
                new_sr->next = stnot_lst;
                stnot_lst = new_sr;
                }
            else {
                new_sr->next = psr->next;
                psr->next = new_sr;
                }
            }
        else
            sr->flags |= CFSR_NODE_MISD;
} void new_nodenm()
{
        extern char *loc_nodename;
        extern STAT_REQ *stnot_lst;
        extern long     this_cell;

STAT_REQ *sr;

sr = stnot_lst;
        while (sr) {
            if ((sr->host == this_cell) && (!sr->targ_name[0]))
                strcpy(sr->targ_name, loc_nodename);

sr = sr->next;
            }
}
```

```
/******************************************************************

Copyright 1985. All Rights Reserved Computer X Inc.

This software is provided to the purchaser under a license which
    forbids reproduction in whole or in part except as provided in
    writing by Computer X Inc.

Module        : %M% %I%
    Date submitted : %E% %U%
    Author        : Gabor Simor
    Description   : This file contains definitions of constants
                    and structure types used by the configuration
                    management

******************************************************************/ include "cnfg_keyw.h"

/*      error numbers for Config_mgt                               */ define PROC_CREATE_FAIL      10    /* process create failed*/
define NO_PROC_TO_NOT        11    /* no process for pntf  */
#define BADR_NONEXT           12    /* bus addr not active  */
#define BADR_EXIST            13    /* bus address is active*/
#define NO_PROCNAME_TO_CHECK  14    /* no process to check  */
#define DOUBLE_GROUP          15    /* same resrc in 2 grps */
#define BAD_RESRC_STRUCT      16    /* SIZE or BADR check bad */
#define REMOTE_CALL           17    /* remote user proc called*/
#define NO_MSGTOA             18    /* can't create msgtoa  */
#define NO_MSGTOA_REP         19    /* can't send to msgtoa*/
#define NO_SIZE_TO_CHECK      20    /* nonext'nt size attr  */
#define INCOMPTBL_SIZE        21    /* size attr inconsist  */
#define PROC_NONEXT           22    /* nonexistant process  */
#define PROC_EXIST            23    /* process exists       */
#define BAD_BOOT_DEV_DEF      24    /* BOOT attr & inv class*/
#define FILE_READ_ERROR       25    /* read err in trip repl*/

/*      minimal message size                   */ define MINSIZE (MSGID_SIZE+KEYSIZE)

/*      resource message header                */ typedef struct res_hd {
    struct res_hd *nxt_comp;
    struct res_hd *nxt_grp;
    unsigned long ntfpid;
    struct res_hd *nxt_res;
} RES_HD;

/*
    Node and Resource Status Notification Request Structure
*/ typedef struct stat_req { struct stat_req *next;       /* next request in list on nod  */
    uint32 flags;                /*                              */
    unsigned long host;          /* host id, transparent if NUL  */
    char   targ_name[MAXNAM];    /* node or service name         */
    struct stat_req *mast_id;    /* addr of main (transp) reque.t*/
    char   subs[MAXNAM];         /* subsystem if code specific   */
    uint32 code;                 /* status code to look for      */
    uint32 id;                   /* "set" id for selective canc l*/
    CONNECTOR res_conn;          /* conn to resource to monitor  */
    CONNECTOR req_conn;          /* conn to requesting process   */
    uint32 tag;                  /* "set" tag for tagged cancel  */
    char   *to_match;            /* req msg content to match     */
    char   *req_msg;             /* req msg if stat not reply    */
    uint32 last_code;            /* last reported status code    */
} STAT_REQ;

#define CFSR_RESOURCE   0x0001   /* resource status monitoring r qd*/
#define CFSR_NODE       0x0002   /* node status monitoring reque: 'd*/
#define CFSR_HOLD       0x0004   /* request to hold after 1st no: 'n*/
#define CFSR_OFF        0x0008   /* notification upon leaving st: :e*/
```

```c
#define CFSR_TRANSP       0x0010    /* req by name or for whole netw'k*/
#define CFSR_SYNC         0x0020    /* synchronized notif reply req'l */
#define CFSR_STAT_MTCH    0x0040    /* status message to match        */
define CFSR_RSRC_MTCH    0x0080    /* resource message to match      */ define CFSR_MATCH_NOMSG  0x1000    /* match pattern allocated        */
define CFSR_HOST_OFF     0x2000    /* host disconnected              */
#define CFSR_STAT_MISD    0x4000    /* no memory => stat notif missed */
#define CFSR_NODE_MISD    0x8000    /* no memory => new node missed   */

/*
    Node and Resource Status Notification Structure
*/ typedef struct stat_not {
    uint32 flags;                   /* status notification flags        */
    uint32 code;                    /* status code reported             */
    unsigned long frst_nodeid;      /* set only if ( NIM && !_SELF)     */
    unsigned long last_nodeid;      /* set only if ( NIM && !_SELF)     */
    char orig[MAXNAM];              /* message originator process name  */
    char code_subs[MAXNAM];         /* subsys name if code not generic  */
    char nodename[MAXNAM];          /* node name if nim reported status */
    MSG_HANDLE resh;                /* resource msg handle, if _RES_TAG */
} STAT_NOT;

#define CFSN_NIM      0x0001    /* set, if NIM status               */
#define CFSN_SELF     0x0002    /* set, if NIM of own node          */
#define CFSN_RES_TAG  0x0004    /* set, if msg tag valid resrc ptr  */
#define CFSN_CLONED   0x0008    /* cloned status (and message)      */

/*
    String Constants
*/ define CONFDIR "//config/"

define myname "Config_mgt"

#define CFG_DEBUG

/*
    Boot Device Status Code
*/ define boot_sync     short define no_boot       0
define polled        1
#define up            2
#define local_failed  3
#define no_boot_up    4

/*
    Macros to Check and Set Local Host Id
*/ define IS_THIS_NODE(c)  (CONN_HOSTID(c) == (unsigned long) this_cell)
define THIS_NODE(c)     (CONN_HOSTID(c) =  (unsigned long) this_cell)
```

What is claimed:

1. In a distributed data processing system having a plurality of interconnected nodes with each node comprising a configuration manager, said system having a process and a resource at the same or separated nodes and a resource manager at the node containing said resource, said process communicating by means of messages, a method by which said process monitors the status of said resource comprising the steps of:
- submitting a monitoring request message from said process to the configuration manager in the node containing said resource, said message requesting the status of said resource and comprising the name or identification number of said resource and a reply option directing one of an immediate reply and a synchronized reply;
- establishing a record of said monitoring request in memory by means of said configuration manager;
- receiving in said configuration manager a report from said resource manager of a status change of said resource; and
- reporting said status change of said resource to said process by said configuration manager.

2. The method of claim 1 wherein said monitoring request further comprises a hold option directing said configuration manager to continue monitoring said resource after said status change of said resource has been reported.

3. The method of claim 1 wherein said monitoring request further comprises:
- a connector option specifically identifying a single resource to be monitored; and
- a code option to direct said configuration manager to only report a specific status change of said resource.

4. The method of claim 3 wherein said monitoring request further comprises an of option to direct said configuration manager to only report a status change of said resource where said status of said resource moves off of said specific status identified by said code option.

5. The method of claim 1 wherein said monitoring request further comprises a matching option requiring a resource definition for said status change report received by said configuration manager match said matching option before said status change is reported to said process.

6. The method of claim 1 wherein said monitoring request further comprises an originator option which requires that a status report received by said configuration manager be transmitted from a particular process.

7. The method of claim 1 further comprising the steps of canceling said monitoring request after reporting said status change to said process.

8. In a distributed data processing system having a plurality of interconnected nodes with each node comprising a configuration manager and a network interface module, said system having a process and a resource at the same or separate nodes, said process communicating by means of messages, a method by which said process monitors the status of said resource comprising the steps of:
- submitting a monitoring request from said process to the configuration manager in the node containing said resource requesting the status of said resource, said request comprising the name or identification number of said resource and a reply option directing one of an immediate reply and a synchronized reply;
- establishing a file in memory by means of said configuration manager receiving said monitoring request;
- sending to said configuration manager a report from said network interface module of status change of a node;
- searching said file to determine if said resource being monitored resided on said node; and
- reporting said status change of said resource to said process if said resource resides on said node.

9. The method of claim 8 wherein said monitoring request further comprises a hold option directing said configuration manager to continue monitoring said resource after said status change of said resource has been reported.

10. The method of claim 8 wherein said monitoring request further comprises:
- a connector option specifically identifying a single resource to be monitored; and
- a code option to direct said configuration manager to only report a specific status change of said resource.

11. The method of claim 10 wherein said monitoring request further comprises an off option to direct said configuration manager to only report a status change of said resource where said status of said resource moves off of said specific status identified by said code option.

12. The method of claim 8 wherein said monitoring request further comprises a matching option requiring a resource definition for said status change report received by said configuration manager match said matching option before said status change is reported to said process.

13. The method of claim 8 wherein said monitoring request further comprises an originator option which requires that a status report received by said configuration manager be transmitted from a particular process.

14. The method of claim 8 further comprising the steps of cancelling said monitoring request after reporting said status change to said process.

15. In a distributed data processing system having a plurality of interconnected nodes with each node comprising a configuration manager and a network interface module, said system comprising a process, said process communicating by means of messages, a method by which said process monitors the status of a node comprising the steps of:
- submitting a monitoring request to said configuration manager from said process requesting the status of said node;
- establishing a record in memory by means of said configuration manager which received said monitoring request;
- receiving a report from said network interface module of a status change of said node; and
- reporting said status change of said node to said process by means of said configuration manager.

16. The method of claim 15 wherein said monitoring request comprises one of a name and an identification number of said node.

17. The method of claim 15 wherein said monitoring request comprises a code option to direct said configuration manager to only report a specific status change of said node.

18. The method of claim 17 wherein said monitoring request further comprises an off option to direct said configuration manager to only report a status change of said node where said status of said node moves off to said specific status identified by said code option.

19. The method of claim 15 wherein said monitoring request comprises a reply option directing one of an immediate reply and a synchronized reply.

20. The method of claim 15 wherein said monitoring request comprises a hold option directing said configuration manager to continue monitoring said node status after said status change of said node has been reported.

21. The method of claim 15 further comprising the step of canceling said monitoring request after reporting said status change to said process.

22. In a distributed data processing system having a plurality of interconnected nodes with each node comprising a configuration manager and a network interface module, said system having a process and a resource at the same or separate nodes, said process communicating by means of messages, a method by which said process monitors the status of said resource comprising the steps of:

sending a request message from said process to the node containing said resource, said message requesting said node to monitor said resource;

communicating said request message in said system through a logical communication ring if said request message contains a resource connector and said resource is remote from the node containing said process;

sending a message to said process indicating a bad request if said request message contains a resource connector and said resource is not a remote resource and said resource is not a valid local resource;

establishing a request record in memory does not contain a resource connector or if said resource is a valid local resource;

establishing a request record in memory for a node having a nodename if said request message is anode status request comprising said nodename;

deleting from memory the request record for said resource if said request message is a request to cancel monitoring of said resource; and sending a reply to said process from said configuration manager if said request message specifies a reply.

23. The method of claim 22 wherein said step of establishing a request record for the node, at which said configuration manager is located, is performed by a service process comprising the steps of:

receiving said request message;

transmitting said request message in said logical communication ring if said message was not from said logical communication ring and is not from a remote node;

rejecting said request message as illegal if said message is not from said logical communication ring and is a message from a remote node;

rejecting said request message as illegal if said message is from a broken logical communication ring;

retransmitting said request message in said logical communication ring if said message is from said logical communication ring, is not from a broken logical communication ring, and a previous ring is lost due to node death;

inserting a host identification and a host name in said request message if said message is from said logical communication ring, is not from a broken logical communication ring and said previous ring is not lost due to node death, and said node has a matching nodename;

forwarding said request message in said logical communication ring if said message is from said logical communication ring, is not from a broken logical communication ring and said previous ring is not lost due to node death, and said logical communication ring has not been completed; and establishing a request record, by means of said configuration manager, for each of said host identification contained in said message if said message is from said logical communication ring, is not from a broken logical communication ring and said previous ring is not lost due to node death, and said logical communication ring has been completed.

24. In a distributed data processing system having a plurality of interconnected nodes with each node comprising a configuration manager and a network interface module, said system having a process and a resource handles the reply to its request for the status of said resource comprising the steps of:

receiving a status message from the configuration manager at the node containing said resource;

exiting said process if said status message contains an illegal node status notification;

determining a new status rom said status message if said status message refers to a valid resource definition;

generating a node startup message if said new status indicates a first connection of a node after node startup;

circulating said status message in a logical communication ring of said system;

notify each process having a matching status request record on said process's configuration manager;

storing said new status code in said matching status request record if said matching status request record is retained; and updating a list of status request records if said status message indicates a connection or a disconnection of a node in said system;

25. The method of claim 24 wherein said step of updating a list of status request records comprises the steps of:

locating a status request record in a list of records stored in memory at the node containing said process;

marking said status request record as disconnected if said request is transparent and a node disconnection of said node containing said resource being monitored by said status request record is reported by said status message;

clearing a node disconnection mark from a status request record if said status message indicates a node reconnection of said node containing said resource being monitored by said status request record;

establishing a request record in said memory for a resource contained on a new node if said status message indicates a node with a new host identification is connected to said system and said resource is being otherwise monitored; and removing said status request record from said memory if said status message indicates a disconnected node with a new nodename.

26. In a distributed data processing system having a plurality of interconnected nodes with each node comprising a configuration manager and a network interface module, said system having a process and a resource at the same or separate nodes, said process communicating by means of messages, a method by which a service process circulates a status message in said system by means of logical communication ring comprising the steps of:

- receiving a status message from the configuration manager at the node containing said resource;
- releasing said status message if said logical communication ring is broken or if said message is from a remote node and said message was in said logical communication ring and said logical communication ring has not been completed;
- recirculating said status message if a previous ring was lost due to node death;
- starting said status message in said logical communication ring if said status message has not been released or recirculated and said logical communication ring has not been completed;
- inserting a host identification and host nodename and forwarding said status message in said logical communication ring if said status message has not been released or recirculated and said status message reports a new node connection;
- forwarding said status message in said logical communication ring if said status message has not been released or recirculated and said status message does not report a new node connection;
- notifying each process having a matching status request record and updating a list of status request records if said logical ring has been completed and there is a new node connection is said system;
- notifying said system of a new master node status if said logical ring has been completed, a new node connection in said system is reported, and said status message does not contain a host identification; and
- releasing said message following said steps of notifying each process or notifying said system of a new master node status.

* * * * *

UNITED STATES PATENT AND TRADEMARK OFFICE
CERTIFICATE OF CORRECTION

PATENT NO. : 5,109,486

DATED : April 28, 1992

INVENTOR(S) : Leslie G. Seymour

It is certified that error appears in the above-identified patent and that said Letters Patent is hereby corrected as shown below:

In claim 22, column 59, line 35, please insert --if said request message-- after the word "memory" and before the word "does".

In claim 22, column 59, line 39, please replace "anode" with the words --a node--.

In claim 23, column 60, line 12, please replace the word "identification" with the word --identifications--.

In claim 24, column 60, line 21, please insert --at the same or separate nodes, a method by which said process-- after the word "resource" and before the word "handles".

UNITED STATES PATENT AND TRADEMARK OFFICE
CERTIFICATE OF CORRECTION

PATENT NO. : 5,109,486

DATED : April 28, 1992

INVENTOR(S) : Leslie G. Seymour

Page 2 of 2

It is certified that error appears in the above-indentified patent and that said Letters Patent is hereby corrected as shown below:

In claim 24, column 60, line 28, please replace "rom" with the word --from--.

Signed and Sealed this

Twelfth Day of October, 1993

Attest:

BRUCE LEHMAN

Attesting Officer

Commissioner of Patents and Trademarks